US012229975B2

(12) United States Patent
Parian

(10) Patent No.: US 12,229,975 B2
(45) Date of Patent: Feb. 18, 2025

(54) LASER SCANNER WITH ULTRAWIDE-ANGLE LENS CAMERA FOR REGISTRATION

(71) Applicant: FARO Technologies, Inc., Lake Mary, FL (US)

(72) Inventor: Jafar Parian, Schlieren (CH)

(73) Assignee: FARO Technologies, Inc., Lake Mary, FL (US)

(*) Notice: Subject to any disclaimer, the term of this patent is extended or adjusted under 35 U.S.C. 154(b) by 770 days.

(21) Appl. No.: 17/379,268

(22) Filed: Jul. 19, 2021

(65) Prior Publication Data

US 2022/0051422 A1 Feb. 17, 2022

Related U.S. Application Data

(60) Provisional application No. 63/094,443, filed on Oct. 21, 2020, provisional application No. 63/064,477, filed on Aug. 12, 2020.

(51) Int. Cl.
*G06T 7/33* (2017.01)
*G01S 17/89* (2020.01)
(Continued)

(52) U.S. Cl.
CPC .............. *G06T 7/344* (2017.01); *G01S 17/89* (2013.01); *G06T 3/14* (2024.01); *G06T 2207/10024* (2013.01); *G06T 2207/10028* (2013.01)

(58) Field of Classification Search
CPC .................. G01S 17/89; G01S 7/4808; G06T 2207/10024; G06T 2207/10028;
(Continued)

(56) References Cited

U.S. PATENT DOCUMENTS 8,384,914 B2 2/2013 Becker et al.
8,699,036 B2 4/2014 Ditte et al.
(Continued)

FOREIGN PATENT DOCUMENTS

| CN | 107316325 A | * 11/2017 | ............ G06T 5/006 |
| JP | 2012103805 A | * 5/2012 | |
| WO | 2016089430 A1 | 6/2016 | |

OTHER PUBLICATIONS

De Silva et al., "Robust Fusion of LiDAR and Wide-Angle Camera Data for Autonomous Mobile Robots," Sensors, 18, 2730; doi:10.3390/s18082730, Aug. 20, 2018, pp. 1-21.
(Continued)

*Primary Examiner* — Michael J Vanchy, Jr.
(74) *Attorney, Agent, or Firm* — McCarter & English, LLP; Dave S. Christensen

(57) ABSTRACT

According to one or more embodiments, a method includes capturing a first three-dimensional (3D) point cloud and a second 3D point cloud. Each of the 3D point clouds includes a plurality 3D coordinates corresponding to one or more objects scanned in a surrounding environment. The first 3D point cloud and the second 3D point cloud capturing at least one overlapping portion. Further, the method includes capturing a first ultrawide-angle image and a second ultrawide-angle image of the surrounding environment, the first ultrawide-angle image captures color information of the first 3D point cloud, and the second ultrawide-angle image captures color information of the second 3D point cloud. The method further includes registering the first 3D point cloud and the second 3D point cloud by mapping one or more features from the first ultrawide-angle image and the second ultrawide-angle image.

11 Claims, 17 Drawing Sheets

(51) Int. Cl.
*G06T 3/00* (2024.01)
*G06T 3/14* (2024.01)

(58) Field of Classification Search
CPC ........... G06T 3/12; G06T 3/14; G06T 3/4038; G06T 7/33; G06T 7/344
See application file for complete search history.

(56) References Cited

U.S. PATENT DOCUMENTS

| | | |
|---|---|---|
| 8,705,012 B2 | 4/2014 | Greiner et al. |
| 9,661,295 B2 | 5/2017 | Bridges |
| 9,739,886 B2 | 8/2017 | Zweigle et al. |
| 9,909,855 B2 | 3/2018 | Becker et al. |
| 9,964,402 B2 | 5/2018 | Tohme et al. |
| 10,067,231 B2 | 9/2018 | Zweigle et al. |
| 10,175,360 B2 | 1/2019 | Zweigle et al. |
| 10,989,532 B2 | 4/2021 | Buback et al. |
| 2012/0069352 A1 | 3/2012 | Ossig et al. |
| 2016/0033643 A1 | 2/2016 | Zweigle et al. |
| 2016/0245918 A1 | 8/2016 | Becker et al. |
| 2017/0161867 A1 | 6/2017 | Becker et al. |
| 2018/0158200 A1* | 6/2018 | Metzler ................ G01C 15/00 |
| 2018/0285482 A1 | 10/2018 | Santos et al. |

OTHER PUBLICATIONS

Extended European Search Report; Issued: Jan. 10, 2022; Application No. 21189635.2; Filed: Aug. 4, 2021; 19 pages.

* cited by examiner

810

| Function | Domain | Range |
|---|---|---|
| $\sin^{-1}(x)$ | $[-1, 1]$ | $\left[-\frac{\pi}{2}, \frac{\pi}{2}\right]$ |
| $\cos^{-1}(x)$ | $[-1, 1]$ | $[0, \pi]$ |
| $\tan^{-1}(x)$ | $(-\infty, \infty)$ | $\left(-\frac{\pi}{2}, \frac{\pi}{2}\right)$ |
| $\cot^{-1}(x)$ | $(-\infty, \infty)$ | $(0, \pi)$ |
| $\sec^{-1}(x)$ | $(-\infty, -1] \cup [1, \infty)$ | $\left[0, \frac{\pi}{2}\right) \cup \left(\frac{\pi}{2}, \pi\right]$ |
| $\csc^{-1}(x)$ | $(-\infty, -1] \cup [1, \infty)$ | $\left[-\frac{\pi}{2}, 0\right) \cup \left(0, \frac{\pi}{2}\right]$ |

FIG. 8

LASER SCANNER WITH ULTRAWIDE-ANGLE LENS CAMERA FOR REGISTRATION

BACKGROUND

The subject matter disclosed herein relates to use of a 3D laser scanner time-of-flight (TOF) coordinate measurement device and particularly a 3D laser scanner that registers multiple scan using an ultrawide-angle lens camera. A 3D laser scanner of this type steers a beam of light to a non-cooperative target such as a diffusely scattering surface of an object. A distance meter in the device measures a distance to the object, and angular encoders measure the angles of rotation of two axles in the device. The measured distance and two angles enable a processor in the device to determine the 3D coordinates of the target.

A TOF laser scanner is a scanner in which the distance to a target point is determined based on the speed of light in air between the scanner and a target point. Laser scanners are typically used for scanning closed or open spaces such as interior areas of buildings, industrial installations and tunnels. They may be used, for example, in industrial applications and accident reconstruction applications. A laser scanner optically scans and measures objects in a volume around the scanner through the acquisition of data points representing object surfaces within the volume. Such data points are obtained by transmitting a beam of light onto the objects and collecting the reflected or scattered light to determine the distance, two-angles (i.e., an azimuth and a zenith angle), and optionally a gray-scale value. This raw scan data is collected, stored and sent to a processor or processors to generate a 3D image representing the scanned area or object.

Generating an image requires at least three values for each data point. These three values may include the distance and two angles, or may be transformed values, such as the x, y, z coordinates. In an embodiment, an image is also based on a fourth gray-scale value, which is a value related to irradiance of scattered light returning to the scanner.

Most TOF scanners direct the beam of light within the measurement volume by steering the light with a beam steering mechanism. The beam steering mechanism includes a first motor that steers the beam of light about a first axis by a first angle that is measured by a first angular encoder (or another angle transducer). The beam steering mechanism also includes a second motor that steers the beam of light about a second axis by a second angle that is measured by a second angular encoder (or another angle transducer).

Many contemporary laser scanners include a color camera mounted on the laser scanner for gathering camera digital images of the environment and for presenting the camera digital images to an operator of the laser scanner. By viewing the camera images, the operator of the scanner can determine the field of view of the measured volume and adjust settings on the laser scanner to measure over a larger or smaller region of space. In addition, the camera digital images may be transmitted to a processor to add color to the scanner image. To generate a color scanner image, at least three positional coordinates (such as x, y, z) and three color values (such as red, green, blue "RGB") are collected for each data point.

Some 3D scanners use high dynamic range (HDR) techniques with the color camera to provide enhanced color images that used with the scanner image to provide a more accurate color representation of the scanned environment. HDR techniques involve acquiring multiple images at each location with different exposure settings. These images are then combined to provide a resulting image that more accurately represents the environment. Another option for HDR, sometimes named interference mode, is to apply different exposure times to different parts of one captured image. This technique is useful in areas having high contrast (light and dark areas). While HDR images are certainly useful in enhancing the color of the scanner image, the acquiring of multiple images at different exposures can be time consuming. For example, to acquire images in a 360 spherical area about the 3D scanner may take more than 60 images. If each of these 60 images has multiple exposures, then the time to acquire all of the images may be lengthy.

Accordingly, while existing 3D scanners are suitable for their intended purposes, what is needed is a 3D scanner having certain features of embodiments of the present disclosure.

BRIEF DESCRIPTION

A system includes a three-dimensional (3D) scanner that captures a 3D point cloud that comprises a plurality of 3D coordinates corresponding to one or more objects scanned in a surrounding environment. The system further includes a camera that captures an image of the surrounding environment, the image captures color information of the surrounding environment, and the image being an ultrawide-angle image. The system further includes one or more processors that register a first scan that is captured from a first position with a second scan that is captured from a second position. The first scan includes a first 3D point cloud and a first ultrawide-angle image, and the and the second scan includes a second 3D point cloud and a second ultrawide-angle image. The first scan and the second scan capture at least one overlapping portion.

Registering the first scan and the second scan includes, for a set of 3D coordinates (X, Y, Z) from each 3D point cloud from the first 3D point cloud and the second 3D point cloud, computing a corresponding set of 2D coordinates (x, y) from the corresponding ultrawide-angle image based on a zenith angle ($\theta$). Further, in response to the 2D coordinates (x, y) being in a first region of the ultrawide-angle image, a first set of correction factors ($\Delta x1$, $\Delta y1$) is computed, and the 2D coordinates are adjusted using the first set of correction factors. Further, in response to the 2D coordinates being in a second region of the ultrawide-angle image, a second set of correction factors ($\Delta x1$, $\Delta y1$) are computed, and the 2D coordinates are adjusted using the second set of correction factors. Further yet, the first ultrawide-angle image and the second ultrawide-angle image, using the adjusted 2D coordinates, are compared to determine matching features in the first ultrawide-angle image and the second ultrawide-angle image. The first ultrawide-angle image and the second ultrawide-angle image are registered based on the matching features. Further, the first 3D point cloud and the second 3D point cloud are aligned based on the matching features.

According to one or more embodiments, each of the ultrawide-angle images has an angular field of view of at least 180°.

According to one or more embodiments, the zenith angle ($\theta$) is computed using the 3D coordinates in a manner that eliminates disambiguation of a resulting sign and value of a coefficient m, which is used to compute the 2D coordinates corresponding to the 3D coordinates.

According to one or more embodiments, the registering further includes partitioning each of the ultrawide-angle images into a plurality of regions comprising the first region and the second region. According to one or more embodiments, the regions in an ultrawide-angle image include concentric rings around a center of said ultrawide-angle image.

According to one or more embodiments, the first set of correction factors is computed using a first set of equations, which is different from a second set of equations used to compute the second set of correction factors.

According to one or more embodiments, the one or more processors are part of the 3D scanner. According to one or more embodiments, the camera is mounted on the 3D scanner at a predetermined position.

According to one or more embodiments, a method includes capturing a first three-dimensional (3D) point cloud and a second 3D point cloud. Each of the 3D point clouds includes a plurality 3D coordinates corresponding to one or more objects scanned in a surrounding environment. The first 3D point cloud and the second 3D point cloud capturing at least one overlapping portion. Further, the method includes capturing a first ultrawide-angle image and a second ultrawide-angle image of the surrounding environment, the first ultrawide-angle image captures color information of the first 3D point cloud, and the second ultrawide-angle image captures color information of the second 3D point cloud. The method further includes registering the first 3D point cloud and the second 3D point cloud by mapping one or more features from the first ultrawide-angle image and the second ultrawide-angle image.

According to one or more embodiments, a computer program product includes a memory device with computer executable instructions stored thereon, the computer executable instructions when executed by one or more processors cause the one or more processors to perform the method(s) described herein.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 8 depicts a table that provides the domains and ranges of various trigonometric functions;

Figure 1:
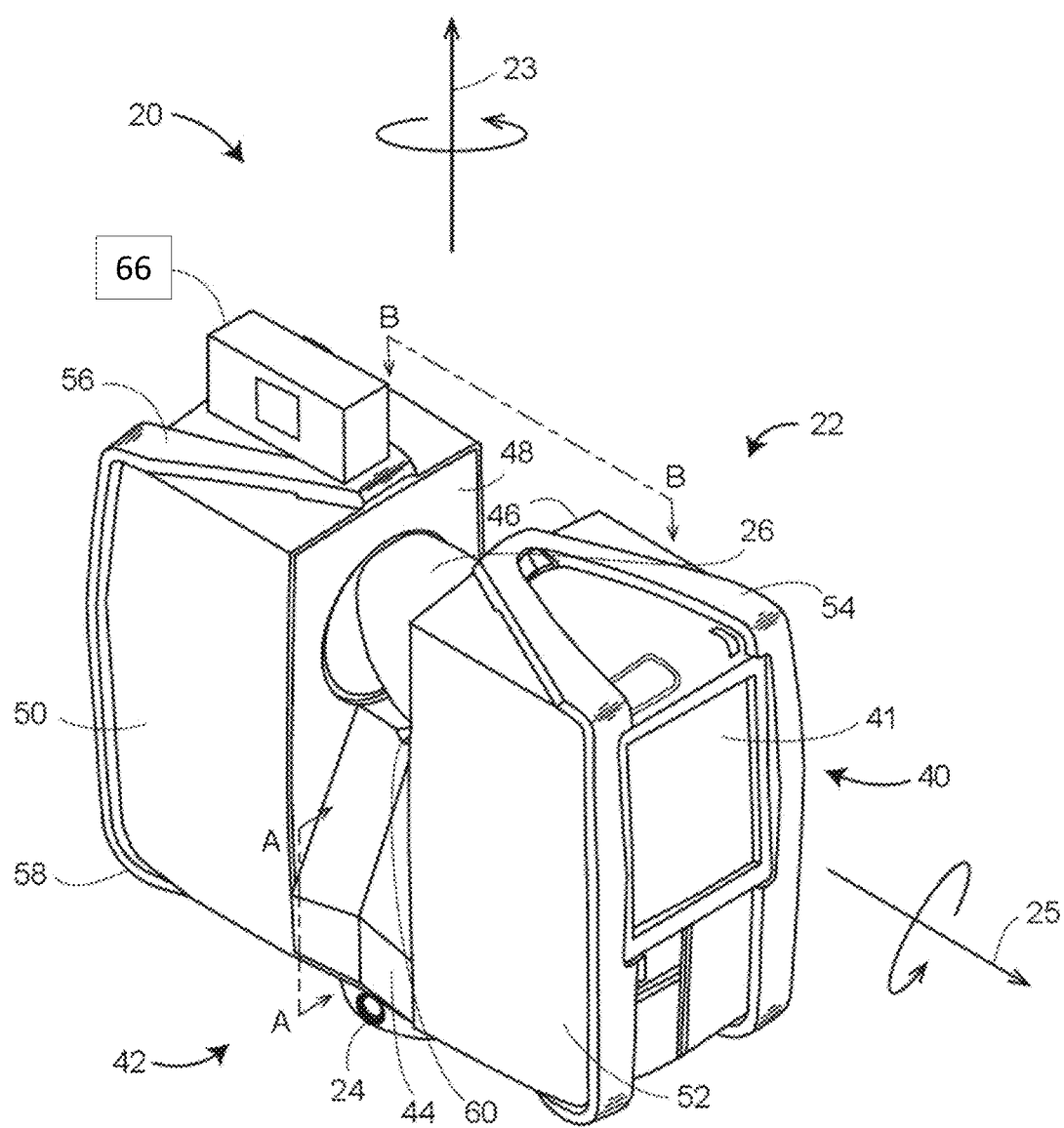
FIG. 1 is a perspective view of a laser scanner in accordance with an embodiment.

The detailed description explains embodiments of the invention, together with advantages and features, by way of example with reference to the drawings.

DETAILED DESCRIPTION

Embodiments herein relate to a 3D measuring device having a 3D scanner and at least one camera that has a ultrawide-angle lens to capture color images. Embodiments provide advantages to acquiring three-dimensional (3D) coordinates of an area of the environment, acquiring a 2D color image of that area using the camera, and mapping the 2D ultrawide-angle image to the 3D coordinates. The result is an interactive 3D scan of the area that includes the captured 3D coordinates and color. Embodiments provide advantages in reducing the time required to acquiring the color images and colorizing the captured 3D coordinates, particularly in comparison to all existing techniques. In the existing techniques, the scanner system rotates (vertically and horizontally) to different viewing directions and the camera captures images. Depending on the camera field of view, the number of image capture varies. For a typical technological case, a built-in camera with a nodal point, which is identical to the laser scanner nodal point (no parallax), takes many images due to a narrow camera field of view. In other technological cases, in which the camera has a parallax to the laser scanner, a wider field of view camera is used. Using embodiments herein, a lower number of images are required in comparison to the built-in camera and external wide-angle camera techniques to cover 360° environment.

Further, embodiments herein facilitate using the mapping of the 2D ultrawide-angle images for registration of one or more scans. In some systems, during the scanning process, the scanner acquires, at different times, a series of ultrawide-angle images of the patterns of light formed on the object surface. These multiple images are then registered relative to each other so that the position and orientation of each image relative to the other images are known. Where the scanner is handheld, various techniques have been used to register the images. One common technique uses features in the images to match overlapping areas of adjacent image frames. This technique works well when the object being measured has many features relative to the field of view of the scanner. However, if the object contains a relatively large flat or curved surface, the images may not properly register relative to each other.

A 3D image of a scene may require multiple scans from different registration positions. The overlapping scans are registered in a joint coordinate system, for example, as described in U.S. Published Patent Application No. 2012/0069352 ('352), the contents of which are incorporated herein by reference. Such registration is performed by matching targets in overlapping regions of the multiple scans. The targets may be artificial targets such as spheres or checkerboards or they may be natural features such as corners or edges of walls. Some registration procedures involve relatively time-consuming manual procedures such as identifying, by an operator, each target and matching the targets obtained by the scanner in each of the different registration positions. Some registration procedures also require establishing an external "control network" of registration targets measured by an external device such as a total station.

However, even with these improvements, it is today difficult to remove the need for an operator to carry out the manual registration steps as described above. In a typical case, only 30% of 3D scans can be automatically registered to scans taken from other registration positions. Today such registration is seldom carried out at the site of the 3D measurement but instead in a remote location following the scanning procedure. In a typical case, a project requiring a week of scanning requires two to five days to manually register the multiple scans. This adds to the cost of the scanning project. Furthermore, the manual registration process sometimes reveals that the overlap between adjacent scans was insufficient to provide proper registration. In other cases, the manual registration process may reveal that certain sections of the scanning environment have been omitted. When such problems occur, the operator must return to the site to obtain additional scans. In some cases, it is not possible to return to a site. A building that was available for scanning at one time may be impossible to access at a later time for example. Further, a forensics scene of an automobile accident or a homicide is often not available for taking of scans for more than a short time after the incident.

It should be appreciated that where an object (e.g. a wall, a column, or a desk) blocks the beam of light, that object will be measured but any objects or surfaces on the opposite side will not be scanned since they are in the shadow of the object relative to the scanner. Therefore, to obtain a more complete scan of the environment, the TOF scanner is moved to different locations and separate scans are performed. Subsequent to the performing of the scans, the 3D coordinate data (i.e. the point cloud) from each of the individual scans are registered to each other and combined to form a 3D image or model of the environment.

Figure 2:
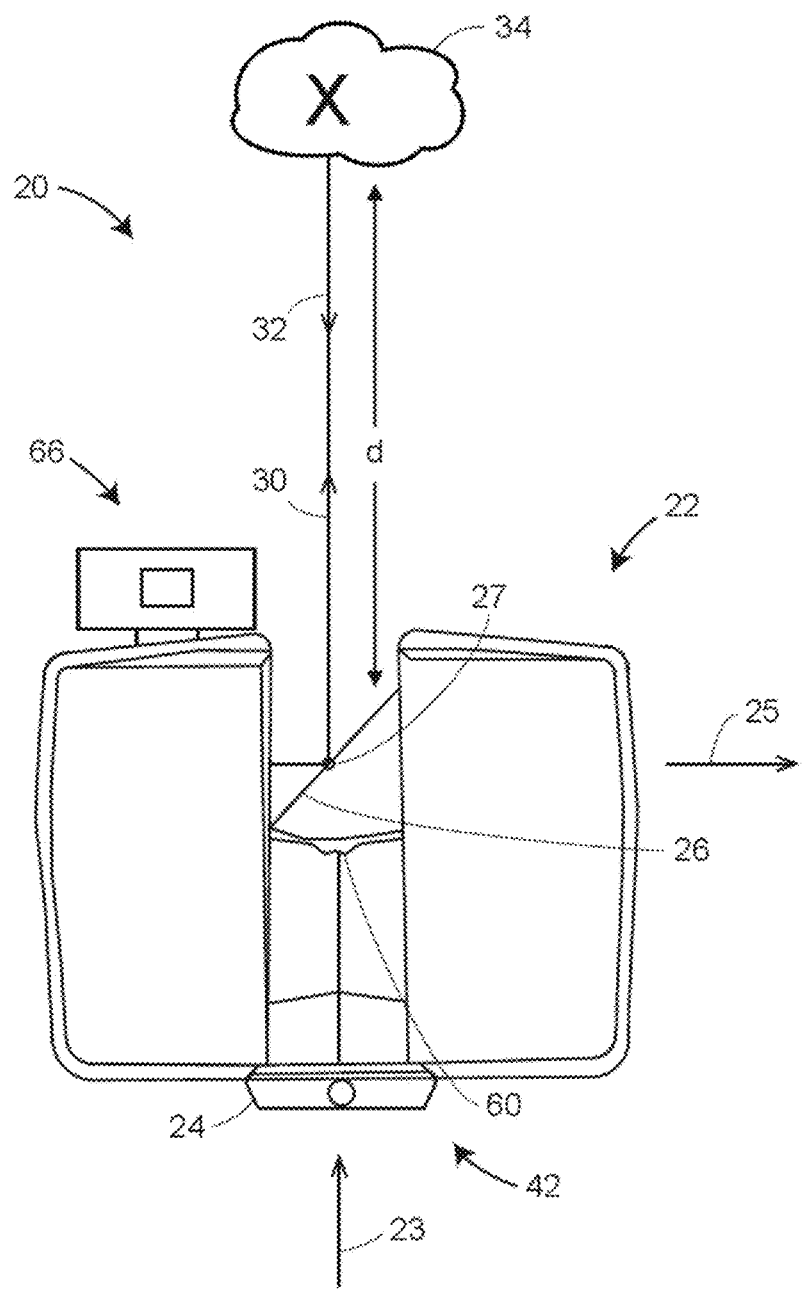
FIG. 2 is a side view of the laser scanner illustrating a method of measurement according to an embodiment.
Figure 3:
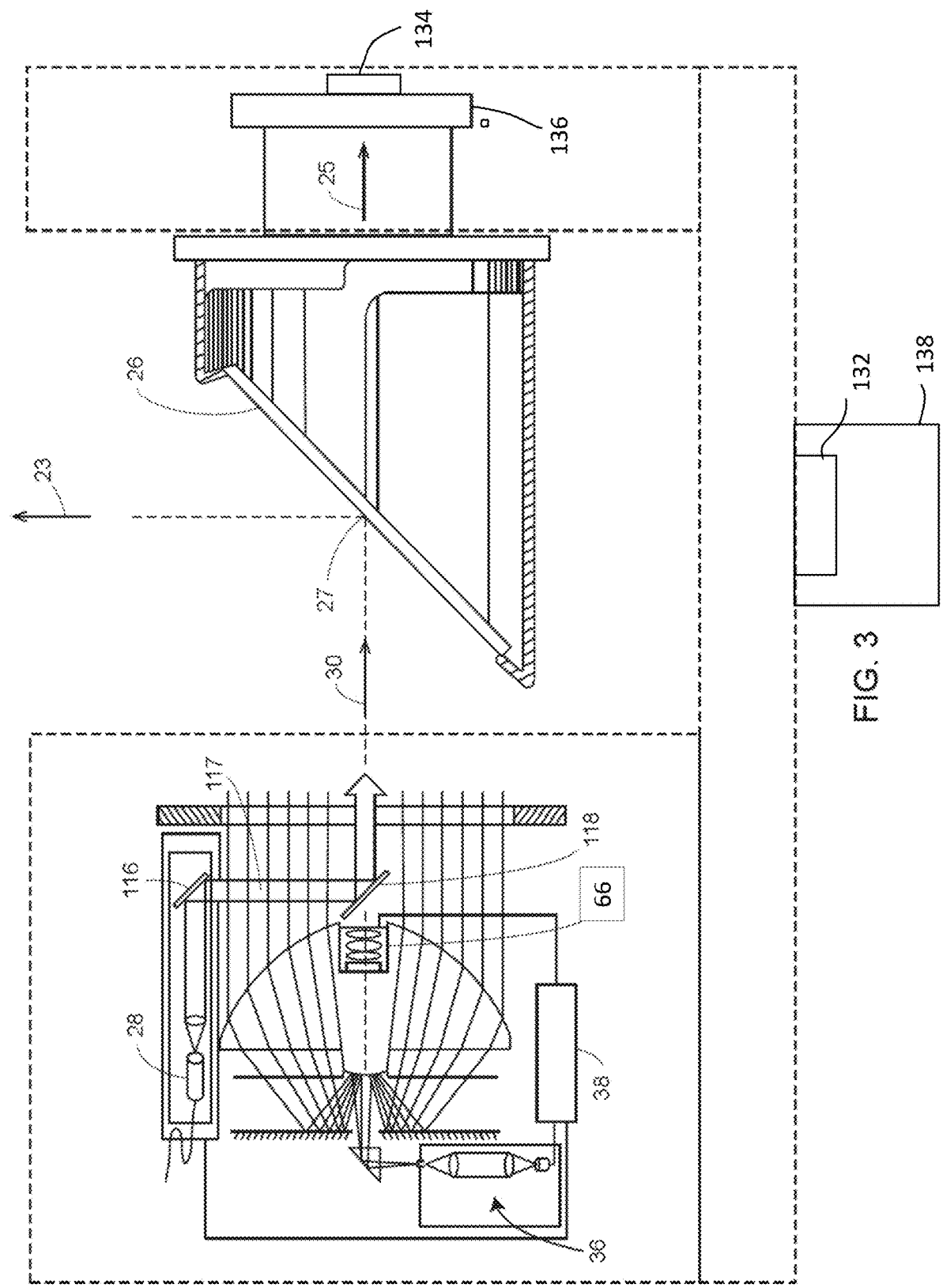
FIG. 3 is a schematic illustration of the optical, mechanical, and electrical components of the laser scanner according to an embodiment.

Referring now to FIGS. 1-3, a laser scanner 20 is shown for optically scanning and measuring the environment surrounding the laser scanner 20. The laser scanner 20 has a measuring head 22 and a base 24. The measuring head 22 is mounted on the base 24 such that the laser scanner 20 may be rotated about a vertical axis 23. In one embodiment, the measuring head 22 includes a gimbal point 27 that is a center of rotation about the vertical axis 23 and a horizontal axis 25. The measuring head 22 has a rotary mirror 26, which may be rotated about the horizontal axis 25. The rotation about the vertical axis may be about the center of the base 24. The terms vertical axis and horizontal axis refer to the scanner in its normal upright position. It is possible to operate a 3D coordinate measurement device on its side or upside down, and so to avoid confusion, the terms azimuth axis and zenith axis may be substituted for the terms vertical axis and horizontal axis, respectively. The term pan axis or standing axis may also be used as an alternative to vertical axis.

The measuring head 22 is further provided with an electromagnetic radiation emitter, such as light emitter 28, for example, that emits an emitted light beam 30. In one embodiment, the emitted light beam 30 is a coherent light beam such as a laser beam. The laser beam may have a wavelength range of approximately 300 to 1600 nanometers, for example 790 nanometers, 905 nanometers, 1550 nm, or less than 400 nanometers. It should be appreciated that other electromagnetic radiation beams having greater or smaller wavelengths may also be used. The emitted light beam 30 is amplitude or intensity modulated, for example, with a sinusoidal waveform or with a rectangular waveform. The emitted light beam 30 is emitted by the light emitter 28 onto a beam steering unit, such as mirror 26, where it is deflected to the environment. A reflected light beam 32 is reflected from the environment by an object 34. The reflected or scattered light is intercepted by the rotary mirror 26 and directed into a light receiver 36. The directions of the emitted light beam 30 and the reflected light beam 32 result from the angular positions of the rotary mirror 26 and the measuring head 22 about the axes 25 and 23, respectively. These angular positions in turn depend on the corresponding rotary drives or motors.

Coupled to the light emitter 28 and the light receiver 36 is a controller 38. The controller 38 determines, for a multitude of measuring points X (FIG. 2), a corresponding number of distances d between the laser scanner 20 and the points X on object 34. The distance to a particular point X is determined based at least in part on the speed of light in air through which electromagnetic radiation propagates from the device to the object point X. In one embodiment the phase shift of modulation in light emitted by the laser scanner 20 and the point X is determined and evaluated to obtain a measured distance d.

The speed of light in air depends on the properties of the air such as the air temperature, barometric pressure, relative humidity, and concentration of carbon dioxide. Such air properties influence the index of refraction n of the air. The speed of light in air is equal to the speed of light in vacuum c divided by the index of refraction. In other words, $c_{air}=c/n$. A laser scanner of the type discussed herein is based on the time-of-flight (TOF) of the light in the air (the round-trip time for the light to travel from the device to the object and back to the device). Examples of TOF scanners include scanners that measure round trip time using the time interval between emitted and returning pulses (pulsed TOF scanners), scanners that modulate light sinusoidally and measure phase shift of the returning light (phase-based scanners), as well as many other types. A method of measuring distance based on the time-of-flight of light depends on the speed of light in air and is therefore easily distinguished from methods of measuring distance based on triangulation. Triangulation-based methods involve projecting light from a light source along a particular direction and then intercepting the light on a camera pixel along a particular direction. By knowing the distance between the camera and the projector and by matching a projected angle with a received angle, the method of triangulation enables the distance to the object to be determined based on one known length and two known angles of a triangle. The method of triangulation, therefore, does not directly depend on the speed of light in air.

In one mode of operation, the scanning of the volume around the laser scanner 20 takes place by rotating the rotary mirror 26 relatively quickly about axis 25 while rotating the measuring head 22 relatively slowly about axis 23, thereby moving the assembly in a spiral pattern. In an exemplary embodiment, the rotary mirror rotates at a maximum speed of 5820 revolutions per minute. For such a scan, the gimbal point 27 defines the origin of the local stationary reference system. The base 24 rests in this local stationary reference system.

In addition to measuring a distance d from the gimbal point 27 to an object point X, the scanner 20 may also collect gray-scale information related to the received intensity (equivalent to the term "brightness" or "optical power") value. The gray-scale value may be determined at least in part, for example, by integration of the bandpass-filtered and amplified signal in the light receiver 36 over a measuring period attributed to the object point X. As will be discussed in more detail herein, the intensity value may be used to enhance color images that are used to colorize the scanned data.

The measuring head 22 may include a display device 40 integrated into the laser scanner 20. The display device 40 may include a graphical touch screen 41, as shown in FIG. 1, which allows the operator to set the parameters or initiate the operation of the laser scanner 20. For example, the screen 41 may have a user interface that allows the operator to provide measurement instructions to the device, and the screen may also display measurement results.

The laser scanner 20 includes a carrying structure 42 that provides a frame for the measuring head 22 and a platform for attaching the components of the laser scanner 20. In one embodiment, the carrying structure 42 is made from a metal such as aluminum. The carrying structure 42 includes a traverse member 44 having a pair of walls 46, 48 on opposing ends. The walls 46, 48 are parallel to each other and extend in a direction opposite the base 24. Shells 50, 52 are coupled to the walls 46, 48 and cover the components of the laser scanner 20. In the exemplary embodiment, the shells 50, 52 are made from a plastic material, such as polycarbonate or polyethylene for example. The shells 50, 52 cooperate with the walls 46, 48 to form a housing for the laser scanner 20.

On an end of the shells 50, 52 opposite the walls 46, 48 a pair of yokes 54, 56 are arranged to partially cover the respective shells 50, 52. In the exemplary embodiment, the yokes 54, 56 are made from a suitably durable material, such as aluminum for example, that assists in protecting the shells 50, 52 during transport and operation. The yokes 54, 56 each includes a first arm portion 58 that is coupled, such as with a fastener for example, to the traverse 44 adjacent the base 24. The arm portion 58 for each yoke 54, 56 extends from the traverse 44 obliquely to an outer corner of the respective shell 50, 52. From the outer corner of the shell, the yokes 54, 56 extend along the side edge of the shell to an opposite outer corner of the shell. Each yoke 54, 56 further includes a second arm portion that extends obliquely to the walls 46, 48. It should be appreciated that the yokes 54, 56 may be coupled to the traverse 42, the walls 46, 48 and the shells 50, 54 at multiple locations.

The pair of yokes 54, 56 cooperate to circumscribe a convex space within which the two shells 50, 52 are arranged. In the exemplary embodiment, the yokes 54, 56 cooperate to cover all of the outer edges of the shells 50, 54, while the top and bottom arm portions project over at least a portion of the top and bottom edges of the shells 50, 52. This provides advantages in protecting the shells 50, 52 and the measuring head 22 from damage during transportation and operation. In other embodiments, the yokes 54, 56 may include additional features, such as handles to facilitate the carrying of the laser scanner 20 or attachment points for accessories for example.

On top of the traverse 44, a prism 60 is provided. The prism extends parallel to the walls 46, 48. In the exemplary embodiment, the prism 60 is integrally formed as part of the carrying structure 42. In other embodiments, the prism 60 is a separate component that is coupled to the traverse 44. When the mirror 26 rotates, during each rotation the mirror 26 directs the emitted light beam 30 onto the traverse 44 and the prism 60. Due to non-linearities in the electronic components, for example in the light receiver 36, the measured distances d may depend on signal strength, which may be measured in optical power entering the scanner or optical power entering optical detectors within the light receiver 36, for example. In an embodiment, a distance correction is stored in the scanner as a function (possibly a nonlinear function) of distance to a measured point and optical power (generally unscaled quantity of light power sometimes referred to as "brightness") returned from the measured point and sent to an optical detector in the light receiver 36. Since the prism 60 is at a known distance from the gimbal point 27, the measured optical power level of light reflected by the prism 60 may be used to correct distance measurements for other measured points, thereby allowing for compensation to correct for the effects of environmental variables such as temperature. In the exemplary embodiment, the resulting correction of distance is performed by the controller 38.

In an embodiment, the base 24 is coupled to a swivel assembly (not shown) such as that described in commonly owned U.S. Pat. No. 8,705,012 ('012), which is incorporated by reference herein. The swivel assembly is housed within the carrying structure 42 and includes a motor 138 that is configured to rotate the measuring head 22 about the axis 23. In an embodiment, the angular/rotational position of the measuring head 22 about the axis 23 is measured by angular encoder 134.

An auxiliary image acquisition device 66 may be a device that captures and measures a parameter associated with the scanned area or the scanned object and provides a signal representing the measured quantities over an image acquisition area. The auxiliary image acquisition device 66 may be, but is not limited to, a pyrometer, a thermal imager, an ionizing radiation detector, or a millimeter-wave detector. In an embodiment, the auxiliary image acquisition device 66 is a color camera with an ultrawide-angle lens, sometimes referred to as a "ultrawide-angle camera."

In an embodiment, the camera 66 is located internally to the scanner (see FIG. 3) and may have the same optical axis as the 3D scanner device. In this embodiment, the camera 66 is integrated into the measuring head 22 and arranged to acquire images along the same optical pathway as emitted light beam 30 and reflected light beam 32. In this embodiment, the light from the light emitter 28 reflects off a fixed mirror 116 and travels to dichroic beam-splitter 118 that reflects the light 117 from the light emitter 28 onto the rotary mirror 26. In an embodiment, the mirror 26 is rotated by a motor 136 and the angular/rotational position of the mirror is measured by angular encoder 134. The dichroic beam-splitter 118 allows light to pass through at wavelengths different than the wavelength of light 117. For example, the light emitter 28 may be a near infrared laser light (for example, light at wavelengths of 780 nm or 1150 nm), with the dichroic beam-splitter 118 configured to reflect the infrared laser light while allowing visible light (e.g., wavelengths of 400 to 700 nm) to transmit through. In other embodiments, the determination of whether the light passes through the beam-splitter 118 or is reflected depends on the polarization of the light. The camera 66 obtains 2D images of the scanned area to capture color data to add to the captured point cloud. In the case of a built-in color camera having an optical axis coincident with that of the 3D scanning device, the direction of the camera view may be easily obtained by simply adjusting the steering mechanisms of the scanner—for example, by adjusting the azimuth angle about the axis 23 and by steering the mirror 26 about the axis 25.

Figure 4:
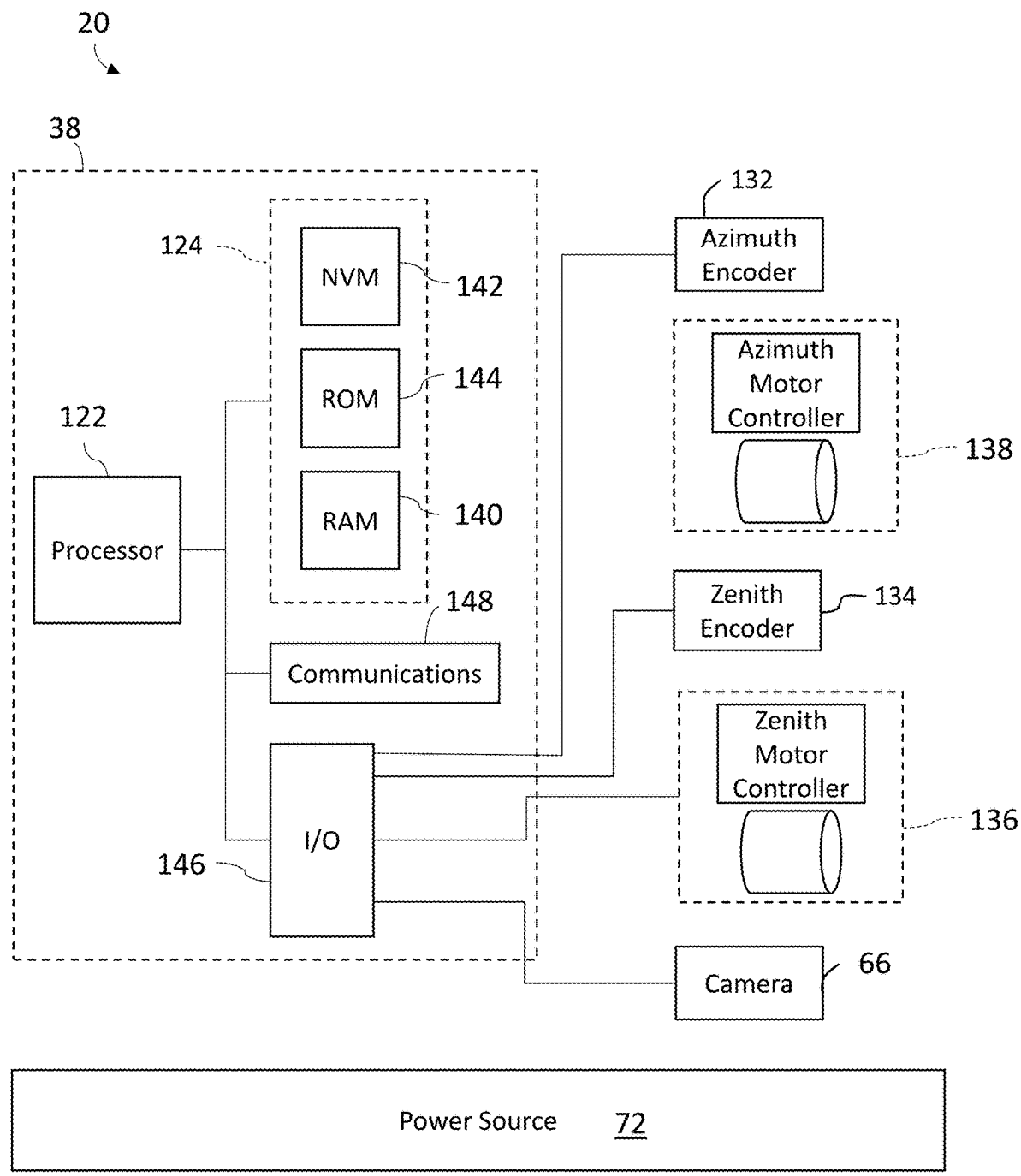
FIG. 4 illustrates a schematic illustration of the laser scanner of FIG. 1 according to an embodiment.

Referring now to FIG. 4 with continuing reference to FIGS. 1-3, elements are shown of the laser scanner 20. Controller 38 is a suitable electronic device capable of accepting data and instructions, executing the instructions to process the data, and presenting the results. The controller 38 includes one or more processing elements 122. The processors may be microprocessors, field programmable gate arrays (FPGAs), digital signal processors (DSPs), and generally any device capable of performing computing functions. The one or more processors 122 have access to memory 124 for storing information.

Controller 38 is capable of converting the analog voltage or current level provided by light receiver 36 into a digital signal to determine a distance from the laser scanner 20 to an object in the environment. Controller 38 uses the digital signals that act as input to various processes for controlling the laser scanner 20. The digital signals represent one or more laser scanner 20 data including but not limited to distance to an object, images of the environment, images acquired by panoramic camera 66, angular/rotational measurements by a first or azimuth encoder 132, and angular/rotational measurements by a second axis or zenith encoder 134.

In general, controller 38 accepts data from encoders 132, 134, light receiver 36, light source 28, and panoramic camera 66 and is given certain instructions for the purpose of generating a 3D point cloud of a scanned environment. Controller 38 provides operating signals to the light source 28, light receiver 36, panoramic camera 66, zenith motor 136 and azimuth motor 138. The controller 38 compares the operational parameters to predetermined variances and if the predetermined variance is exceeded, generates a signal that alerts an operator to a condition. The data received by the controller 38 may be displayed on a user interface 40 coupled to controller 38. The user interface 40 may be one or more LEDs (light-emitting diodes) 82, an LCD (liquid-crystal diode) display, a CRT (cathode ray tube) display, a touchscreen display or the like. A keypad may also be coupled to the user interface for providing data input to controller 38. In one embodiment, the user interface is arranged or executed on a mobile computing device that is coupled for communication, such as via a wired or wireless communications medium (e.g. Ethernet, serial, USB, Bluetooth™ or WiFi) for example, to the laser scanner 20.

The controller 38 may also be coupled to external computer networks such as a local area network (LAN) and the Internet. A LAN interconnects one or more remote computers, which are configured to communicate with controller 38 using a well-known computer communications protocol such as TCP/IP (Transmission Control Protocol/Internet Protocol), RS-232, ModBus, and the like. Additional systems 20 may also be connected to LAN with the controllers 38 in each of these systems 20 being configured to send and receive data to and from remote computers and other systems 20. The LAN may be connected to the Internet. This connection allows controller 38 to communicate with one or more remote computers connected to the Internet.

The processors 122 are coupled to memory 124. The memory 124 may include random access memory (RAM) device 140, a non-volatile memory (NVM) device 142, and a read-only memory (ROM) device 144. In addition, the processors 122 may be connected to one or more input/output (I/O) controllers 146 and a communications circuit 148. In an embodiment, the communications circuit 92 provides an interface that allows wireless or wired communication with one or more external devices or networks, such as the LAN discussed above.

Controller 38 includes operation control methods described herein, which can be embodied in application code. For example, these methods are embodied in computer instructions written to be executed by processors 122, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, C#, Objective-C, Visual C++, Java, ALGOL (algorithmic language), BASIC (beginners all-purpose symbolic instruction code), visual BASIC, ActiveX, HTML (Hypertext Markup Language), Python, Ruby and any combination or derivative of at least one of the foregoing.

Figure 5:
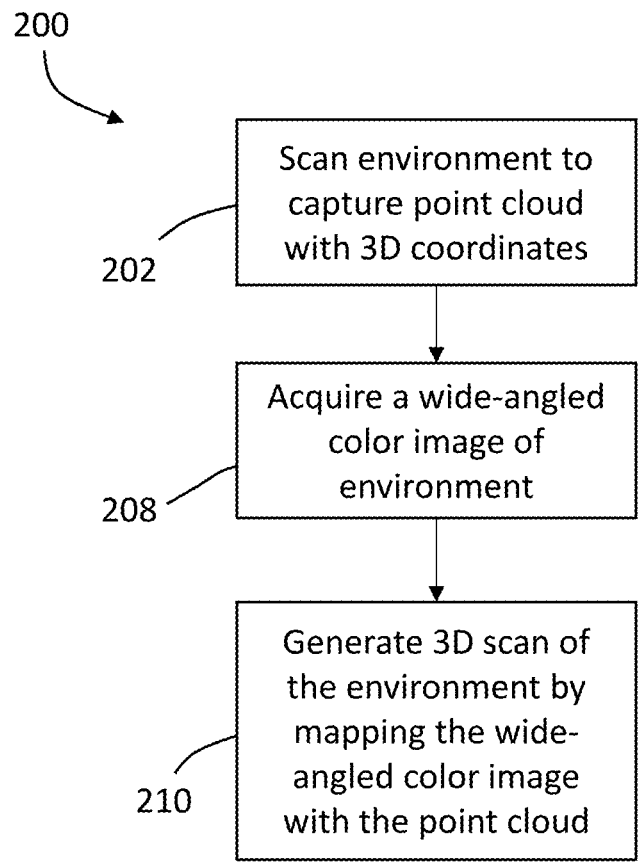
FIG. 5 is a flow diagram of a method of generating enhanced color scans with the laser scanner of FIG. 1.

Referring now to FIG. 5, an embodiment of a method 200 is shown for generating a scan of the environment with the scanner 20. The method 200 begins in block 202 where the environment in which the scanner 20 is positioned is scanned. As described herein, the volume (e.g. the scan area) around the laser scanner 20 is performed by rotating the rotary mirror 26 relatively quickly about axis 25 while rotating the measuring head 22 relatively slowly about axis 23, thereby moving the assembly in a spiral pattern. Thus, for each light beam emitted, a distance value and the angles of the mirror 26 and the measurement head 22 is determined. Thus, a 3D coordinate of a point in the environment may be determined for each emitted and received light beam. Further, for each light beam, an intensity value of the returned light beam is measured.

The light beams are emitted and received as the measurement head 22 is rotated 180 degrees about the axis 23. The method 200 further includes, at block 208, acquiring color images of the environment. In an embodiment, a 2D color image is acquired by the camera 66. The single 2D image acquired using the ultrawide-angle lens captures color data in the spherical volume surrounding the laser scanner 20. In the exemplary embodiment, the 2D acquired color image is in an RGB color model. In other embodiments, other color models, e.g., cyan, magenta, and yellow (CMY), or cyan, magenta, yellow, and black (CMYK), or any other color model can be used.

Once the 2D color image is acquired, the method 200 includes, at block 210, generating a colorized 3D scan by mapping the 2D ultrawide-angle image with the 3D coordinates in the point cloud captured by the scanner 20. Such mapping of the 2D ultrawide-angle image with the 3D point cloud is described further herein.

It should be appreciated that the method 200 provides advantages in generating enhanced color 3D scans over techniques that use HDR (High Dynamic Range) imaging techniques because of requiring fewer number of images to be captured by using an ultrawide-angle field of view.

Physical agents living in complex environments, such as humans and animals, need two types of visual sensing abilities. One is to focus on objects with a precise but small retina and the other is to look around the environment with a wide but coarse retina. Both visual sensing mechanisms are required to enable robust and flexible visual behaviors. In particular, the wide visual information obtained by looking around is necessary to monitor wide areas and to avoid dangerous situations. If the complete surrounding in space can be involved into the perception process, orientation and navigation in space becomes easier and more reliable.

Typically, a camera's field of view is smaller than the human field of view, which limits objects from being captured in a single picture. This technical challenge is addressed by using a ultrawide-angle, i.e., hemispherical or ultrawide-angle lens, which creates a wide field of view image. With a ultrawide-angle lens an image of more than 180° angular field of view can be acquired. Due to the large field of view, it has been used in many applications with different domains such as forestry, the study of plant canopies, geodesy to produce a site obstruction diagram for future GPS missions, etc.

Technical challenges of using such a ultrawide-angle lens include lateral color, high order distortion (edge compression), loss of resolution and severe drop-off of illumination at the full field (e.g., 180°), which limit applications of the ultrawide-angle lenses for precise photogrammetric applications.

Embodiments of the technical solutions described herein address such technical challenges and facilitate using the ultrawide-angle lens to acquire 2D color images and mapping such images to the 3D coordinates in the point cloud. Further, technical effects and benefits of some embodiments include providing a 3D scanner system that rapidly acquires 3D coordinates of a collection of points in a scan area with accurate color information using the single ultrawide-angle 2D color image. In one or more embodiments, the camera 66 can be an omnidirectional camera such as a RICOH® THETA® camera for example. The camera 66 can capture a 360° view of the environment by capturing two images substantially concurrently. The two images may be captured by two ultrawide-angle lenses that are positioned to be facing in opposite directions, each camera capturing a respective field of at least 180°. In some cases, the two images that are captured can have overlapping portions that can be combined/edited, either automatically or manually. It is understood that above description provides some examples of the ultrawide-angle lens, and camera 66 that can be used in one or more embodiments, and that in other embodiments, different lenses and/or cameras can be used.

Figure 6:
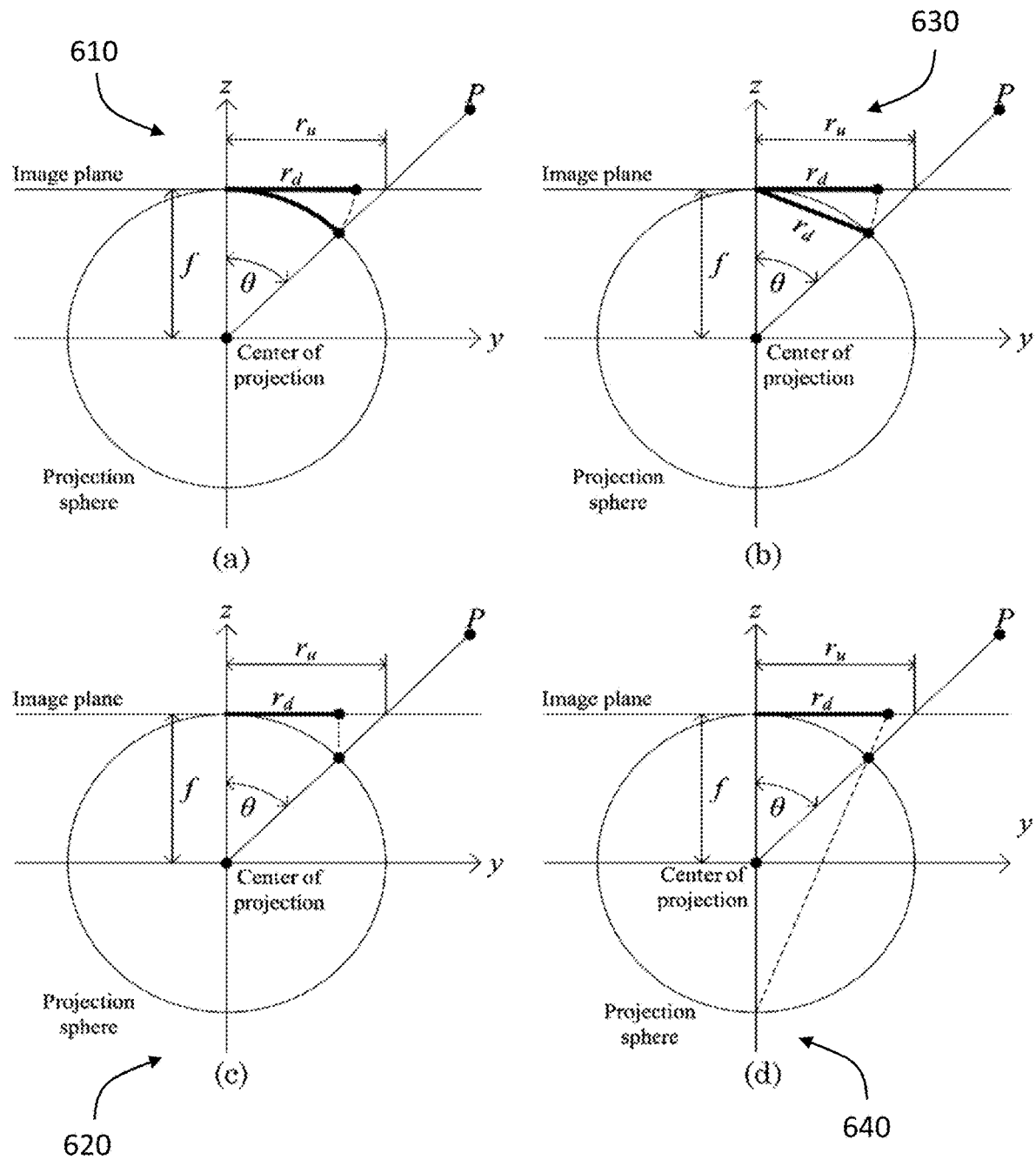
FIG. 6 depicts the projection types of ultra-wide-angle (ultrawide-angle) lens and the path of light from a point in 3D space into the image plane.

FIG. 6 depicts determining coordinates corresponding to pixels representing objects/surfaces captured by a ultrawide-angle image according to one or more embodiments. A difference between a ultrawide-angle lens and a typical rectilinear lens is that the projection from a 3D point to a 2D image in the ultrawide-angle lens is intrinsically non-perspective. Depending on the amount of deviation of the ray, equations below, and FIG. 6 provide four different types of projections which characterize ultrawide-angle lenses:

Equidistant projection (610) $r_d = c \cdot \theta$

Orthographic projection (620): $r_d = c \cdot \sin(\theta)$

-continued

Figure 7:
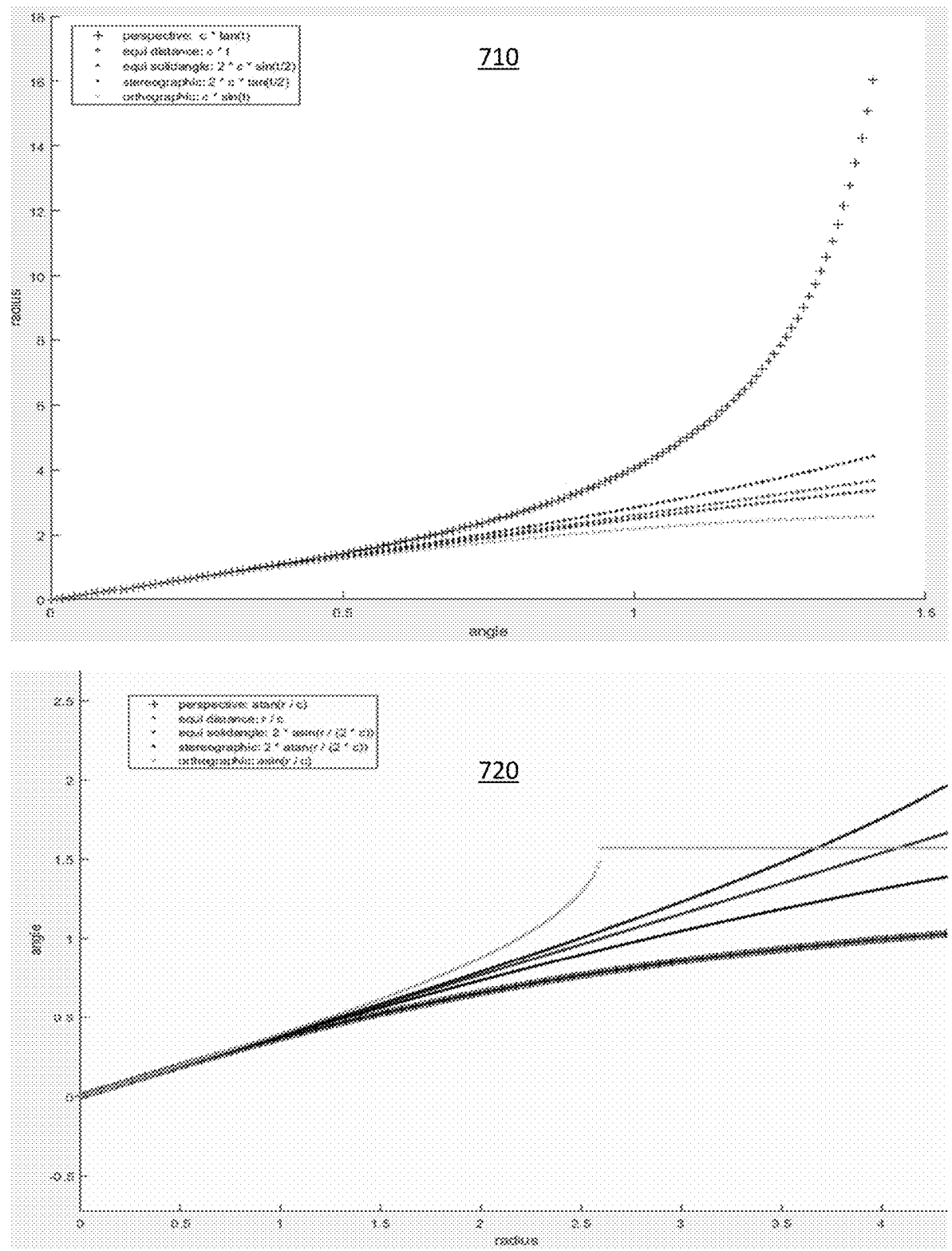
FIG. 7 shows the relation of radius and zenith angle (and reverse) for all ultra-wide angle (ultrawide-angle) lens types at FIG. 6 including also the perspective projection.

Equisolid-angle projection (630): $r_d = 2c \cdot \sin\left(\frac{\theta}{2}\right)$ Stereographic projection (640): $r_d = 2c \cdot \tan\left(\frac{\theta}{2}\right)$ Here, θ is the zenith angle, c is a camera constant (in millimeter or pixels), and $r_d$ is the radius of the image point P (from the principal point). FIG. 7 shows the relation of radius and zenith angle (and reverse) for perspective projection and the four ultrawide-angle lens projection types 610, 620, 630, 640. The plot 710 shows that a lens with perspective projection requires an infinite image plane to projection near (and less) than 180° field of view. The plot 720 shows that orthographic projection type cannot handle field of view near (and more) than 180°. Typically, lenses available are designed to produce an equidistant projection. For example, NIKON® 8-mm f/2.8, CANON® 7.5-mm f/5.6, SIGMA® 15-mm f/2.8 (180° FOV), NIKON® 6-mm (220° FOV), and RICOH® THETA® ultrawide-angle lens 2.6-mm (~204° FOV) are examples of equidistant projection ultrawide-angle lenses.

Collinearity equations represent a set of two equations, used in photogrammetry and remote sensing to relate coordinates in a sensor plane (in two dimensions) to object coordinates (in three dimensions). Equation (1) represents collinearity equations for a 2D ultrawide-angle lens as used in one or more embodiments:

$$\left. \begin{array}{l} x = -\dfrac{c}{m} \cdot \dfrac{U_X}{U_Z} \\ y = -\dfrac{c}{m} \cdot \dfrac{U_Y}{U_Z} \end{array} \right\} \quad (1)$$

Here, (x, y) is the image point coordinates in the photo coordinate system (e.g., millimeter or pixels), c is the camera constant, m is a ultrawide-angle lens coefficient factor (unit free). The ($U_X$, $U_Y$, and $U_Z$) are intermediate values that can be computed as follows:

$$\begin{pmatrix} U_X \\ U_Y \\ U_Z \end{pmatrix} = R^t \cdot \begin{pmatrix} X - X_0 \\ Y - Y_0 \\ Z - Z_0 \end{pmatrix}$$

Here, ($X_0$, $Y_0$, $Z_0$) is the position of the center of projection (see FIG. 6), and (X, Y, Z) is the resulting object point coordinates in 3D space, and $R = R_X R_Y R_Z$, in which:

$$R_X = \begin{pmatrix} 1 & 0 & 0 \\ 0 & \cos(\omega) & -\sin(\omega) \\ 0 & \sin(\omega) & \cos(\omega) \end{pmatrix}, R_Y = \begin{pmatrix} \cos(\varphi) & 0 & \sin(\varphi) \\ 0 & 1 & 0 \\ -\sin(\varphi) & 0 & \cos(\varphi) \end{pmatrix}, \text{ and}$$

$$R_Z = \begin{pmatrix} \cos(\kappa) & -\sin(\kappa) & 1 \\ \sin(\kappa) & \cos(k) & 1 \\ 0 & 0 & 1 \end{pmatrix},$$

where (ω, φ, κ) are the three rotation angles around the X, Y, and Z axes respectively. The point at coordinates (X, Y, Z) in the 3D point cloud is mapped and colorized with the pixel at (x, y) from the 2D ultrawide-angle image as a result of the above calculations.

Only the equidistant projection (610), and the equisolid-angle projection (630) types can properly model the Ricoh Theta ultrawide-angle lens. Accordingly, examples described herein provide equations that are applicable for those two projection models, however, it is understood that other types of projection models can be used without significant changes to the description provided herein. For example, the following are the calculations for the lens coefficient, m, for the equidistant and the equisolid-angle projection types for the ultrawide-angle lens:

Equidistant projection coefficient:

$$m = -\frac{\tan(\theta)}{\theta}$$

Equisolid-angle coefficient:

$$m = -\frac{\tan(\theta)}{2 \cdot \sin\left(\frac{\theta}{2}\right)}$$

It should be noted that in the case of the ultrawide-angle lens of the camera 66, the range of $\theta$ is $[0, \pi]$. Among the trigonometric functions, only the inverse of cosine or the inverse of cotangent return the angle in the range of $[0, \pi]$ (for inverse of cotangent is $(0, \pi)$). Accordingly, one or more embodiments use the inverse of cosine (acos) to determine the angle theta. Inverse of sine or inverse of tangent do not have this property. If they are used in the formulation, they cannot determine the sign and the value of $\theta$ for incoming rays with $\theta$ near to $\pi/2$ or larger than $\pi/2$ (FOV of near to $\pi$ or larger than $\pi$). FIG. 8 depicts a table 810 that provides the domains and ranges of various trigonometric functions. Based on these, the above described calculations of the camera coefficient m are based on using the following computation for the angle $\theta$:

$$\theta = \cos^{-1}\left(-\frac{U_Z}{\sqrt{U_X^2 + U_Y^2}}\right)$$

The above described calculation resolves the ambiguity of mapping the 3D point cloud captured by the laser scanner 20 to pixels from the 2D ultrawide-angle color image from the camera 66 at near to or larger than zenith angle of 90°. By using the above techniques for calculating the angle $\theta$ embodiments described herein eliminate disambiguation of the sign and value of the angle $\theta$. Therefore, the coefficient m and the further calculations that use m are calculated correctly Typically, during mapping an image to a point cloud, straight lines in the real world (i.e., point cloud) are mapped to straight lines in the image generated by the rectilinear camera. However, most real optical systems introduce some undesirable effects, rendering the assumption of the rectilinear camera model inaccurate. In the case of the ultrawide-angle camera 66, a radial distortion (also referred to as "radial barrel distortion") causes points on the image plane to be shifted from their ideal position along a radial axis from the principal point in the ultrawide-angle image plane. The visual effect of this displacement in ultrawide-angle optics is that the image has a higher resolution in the foveal areas, with the resolution decreasing nonlinearly toward the peripheral areas of the image.

Typically, the following set of equations are used to determine correction terms to image point coordinates. The equations use additional parameters for modeling the systemic errors of frame array cameras with rectilinear lenses.

$$\left.\begin{aligned}\Delta x &= dx_0 - \frac{\overline{x}}{c}dc - S_x\overline{x} + a\overline{y} + \overline{x}(r^2 k_1 + r^4 k_2 + r^6 k_3) + \\ &\quad (\overline{y}^2 + 3\overline{x}^2)p_1 + 2\overline{x}\overline{y}p_2 \\ \Delta y &= dy_0 - \frac{\overline{y}}{c}dc + a\overline{x} + \overline{y}(r^2 k_1 + r^4 k_2 + r^6 k_3) + \\ &\quad 2\overline{x}\overline{y}p_1 + (\overline{x}^2 + 3\overline{y}^2)p_2\end{aligned}\right\} \quad (2)$$

Here, dc is a correction to camera constant c, $(dx_0, dy_0)$ represents corrections to the shift of principal point $(x_0, y_0)$, $(S_x, a)$ are affine transformation parameters: scale difference and shear, $k_1, k_2, k_3$ are parameters of radial lens distortion, and $p_1, p_2$ are parameters of decentering lens distortion.

It is known, that in modern electronic sensor manufacturing, the terms $(S_x, a)$ are negligible therefore, equations (2) consists of 8 parameters which are determined through the process of camera self-calibration. However, the inventors note that although such correction terms reduce some of the systemic errors introduced by a ultrawide-angle lens, there are still systemic errors that inhibit the accurate colorizing of the 3D point cloud using the single 2D ultrawide-angle color image.

Embodiments herein further address such technical challenges. In order to model the local systemic errors, which are not modeled by equations (2), embodiments herein partition the image into rings.

Figure 9:
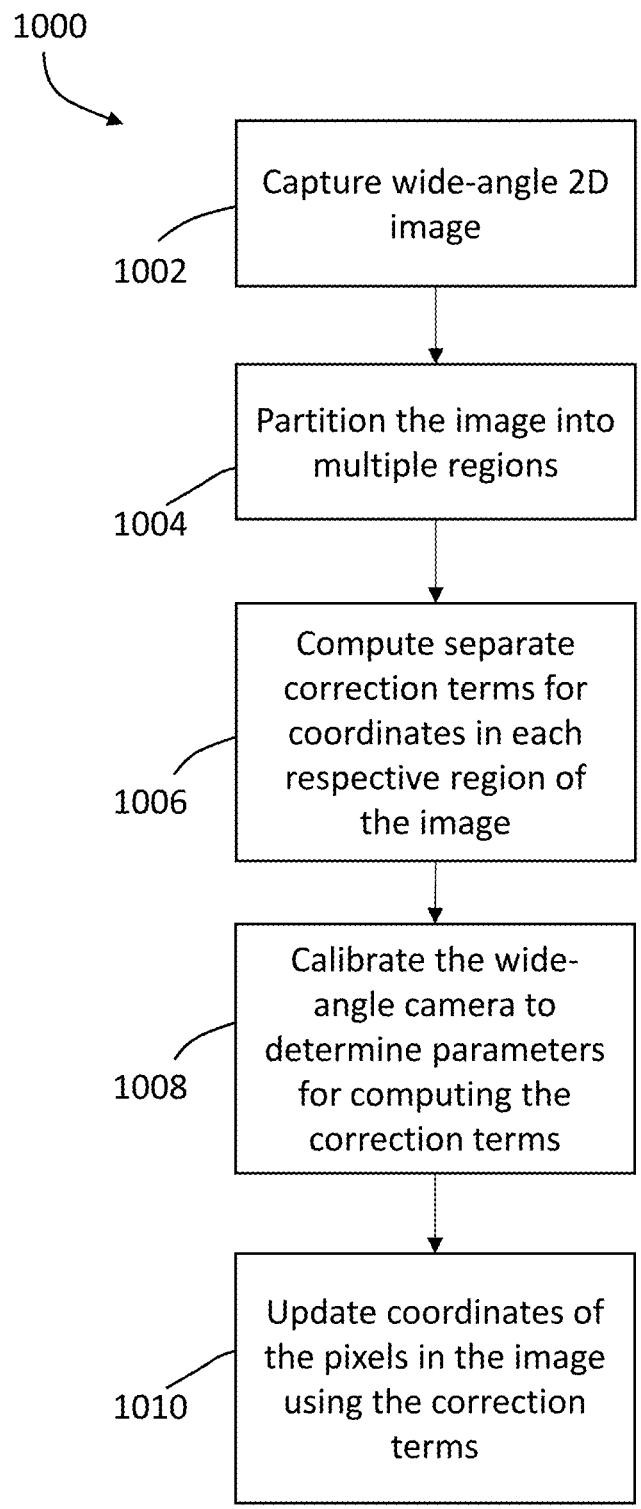
FIG. 9 depicts a flowchart for correcting systemic errors in ultrawide-angle 2D image that is to be mapped with a 3D point cloud according to one or more embodiments.

FIG. 9 depicts a flowchart for correcting systemic errors in ultrawide-angle 2D image that is to be mapped with a 3D point cloud according to one or more embodiments. The method 1000 includes capturing a 2D ultrawide-angle image 900, such as by the camera 66 that is equipped with a ultrawide-angle lens, at block 1002. The method 1000 further includes partitioning the image 900 into one or more regions, at block 1004. In one or more embodiments, the regions are concentric rings, which are concentric with the center of projection of the image 900, in one or more embodiments.

Figure 10:
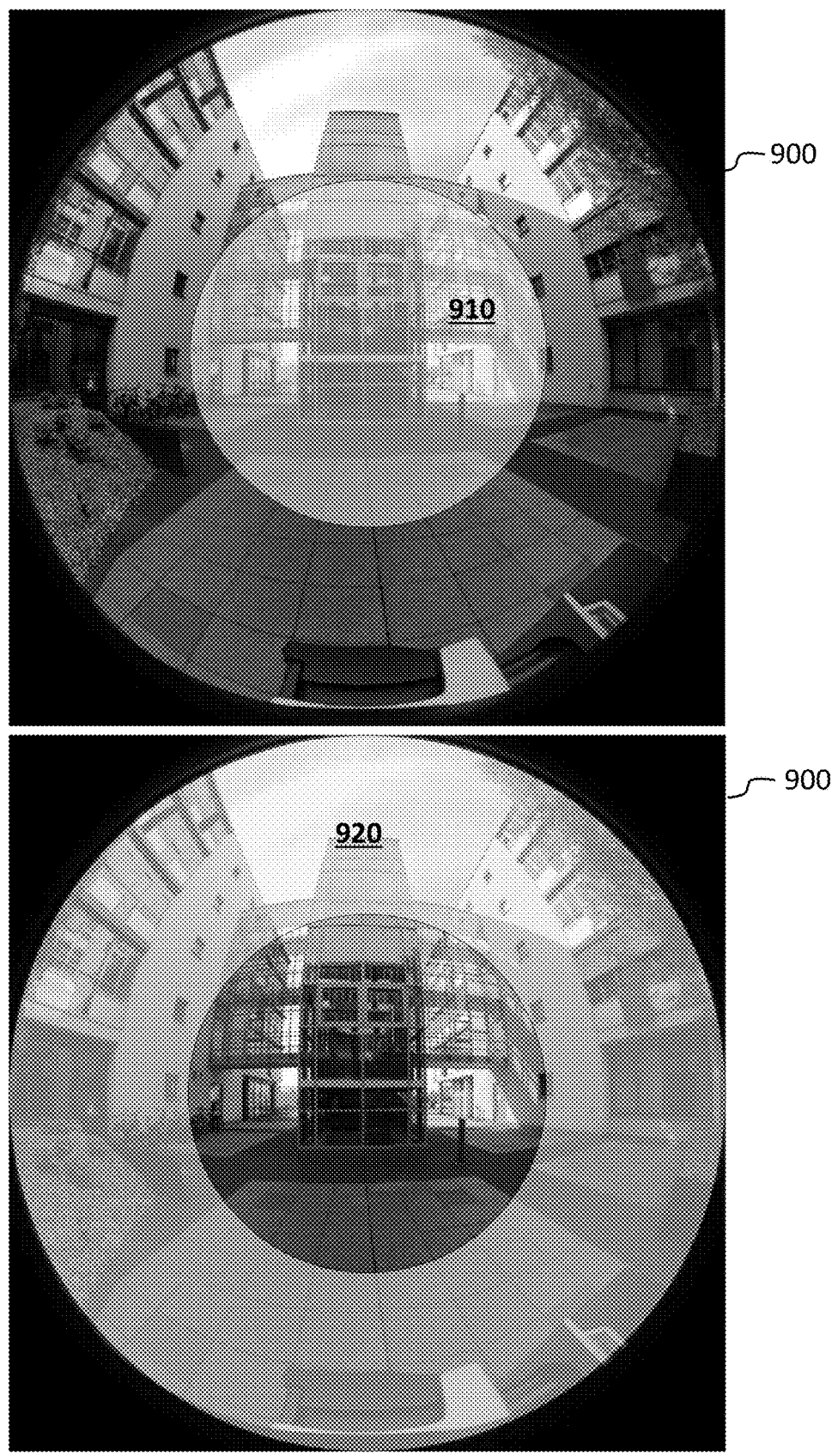
FIG. 10 depicts example partitioning of a 2D ultrawide-angle image according to one or more embodiments.

FIG. 10 depicts example partitioning of a 2D ultrawide-angle image according to one or more embodiments. The image 900 is divided into an inner ring 910 and an outer ring 920, as shown in FIG. 10. It should be noted that in other examples, the image 900 may be partitioned into additional rings, however, the description herein explains the case with the two rings 910, 920. Extending to additional rings will be obvious to a person skilled in the art based on the description herein.

In one or more embodiments, the inner ring 910 is determined based on a predetermined radius from the center of projection. For example, the radius of the inner ring 910 can be specified as 15 millimeters, 20 millimeters, or any other such predetermined value. It should be noted that the radius of the inner ring 910 can be provided in different units in other embodiments, for example, pixels. Alternatively, or in addition, the inner ring 910 is determined based on a predetermined ratio, for example, 30%, 35%, etc., of the radius of the projection. The inner ring 910 can be specified in any other manner. The other regions of the image 900 can be provided similarly, for example, as a pair of radii ($r_{inner}$, $r_{outer}$), where the inner radius defines the inner boundary and the outer radius defines the outer boundary of the region, where the inner boundary is the one that is closer to the center of projection.

Referring back to the flowchart in FIG. 9, the method 1000 further includes computing different correction terms for the coordinates in each region of the image 900, at block 1006. In one or more embodiments, the inner ring 910 uses a first set of correction factors as described by the equations (3) to model the systemic errors in the inner ring 910.

$$\left.\begin{array}{l}\Delta x = dx_0 - \frac{\bar{x}}{c}dc_1 + \bar{x}(r^2 k_{11} + r^4 k_{12} + r^6 k_{13}) + \\ \quad (\bar{y}^2 + 3\bar{x}^2)p_1 + 2\bar{x}\bar{y}p_2 \\ \Delta y = dy_0 - \frac{\bar{y}}{c}dc_1 + \bar{y}(r^2 k_{11} + r^4 k_{12} + r^6 k_{13}) + \\ \quad 2\bar{x}\bar{y}p_1 + (\bar{x}^2 + 3\bar{y}^2)p_2\end{array}\right\} \quad (3)$$

The equations (3) use the same parameters as in the equations (2). Further, equations (4) model the systemic errors in the outer ring 920 with 4 new parameters ($dc_2$, $k_{21}$, $k_{22}$, $k_{23}$) and in total 8 parameters. The new parameters provide, for the outer ring 920, a different camera constant (or different nodal point) $dc_2$, and different symmetrical lens distortion.

$$\left.\begin{array}{l}\Delta x = dx_0 - \frac{\bar{x}}{c}dc_2 + \bar{x}(r^2 k_{21} + r^4 k_{22} + r^6 k_{23}) + \\ \quad (\bar{y}^2 + 3\bar{x}^2)p_1 + 2\bar{x}\bar{y}p_2 \\ \Delta y = dy_0 - \frac{\bar{y}}{c}dc_2 + \bar{y}(r^2 k_{21} + r^4 k_{22} + r^6 k_{23}) + \\ \quad 2\bar{x}\bar{y}p_1 + (\bar{x}^2 + 3\bar{y}^2)p_2\end{array}\right\} \quad (4)$$

Equations (3) and (4) together include 12 unknown parameters which are determined through the self-calibration approach, at block 1008. Calibration of the camera 66 with the ultrawide-angle lens (single camera) is done by using a numerical approach using "bundle adjustment" with camera self-calibration. Given a set of images depicting a number of 3D points from different viewpoints, "bundle adjustment" can be defined as the problem of simultaneously refining the 3D coordinates describing the scene geometry, the parameters of the relative motion, and the optical characteristics of the camera(s) employed to acquire the images, according to an optimality criterion involving the corresponding image projections of all points. In one or more embodiments, bundle adjustment with self-calibration is carried out by using the image points of the camera 66. In one or more embodiments, the parameters can be predetermined values that are provided for the computations.

In one or more embodiments, the calibration and the configuration of the parameter values is performed before using the scanner system in the field. The verification is performed in a controlled environment, where predetermined markers at placed at known coordinates as control points. Alternatively, or in addition, natural features at known coordinates, or positions in the controlled environment are used as the control points. In such a controlled environment, the external measures with control points with good distribution over the entire image regions (inner ring 910 and outer ring 920) are used for the verification of the results.

The correction factors are applied to each of the 2D coordinates of the image 900, at block 1010. Applying the correction factors includes adding (or subtracting) the correction factors to the 2D coordinates. Applying the correction factors to a pixel includes determining which region the pixel is in, and then applying the correction factors associated with that region. For example, if the pixel is presently in the inner ring 910, the (x, y) coordinates of that pixel are modified using the results of the equations (3), and instead, if the pixel is presently in the outer ring 920, the coordinates are modified using the results of the equations (4). For example, (x, y) are computed as described in the equations (1) and are further modified using the delta values computed either in the equations (3) or the equations (4).

Figure 11:
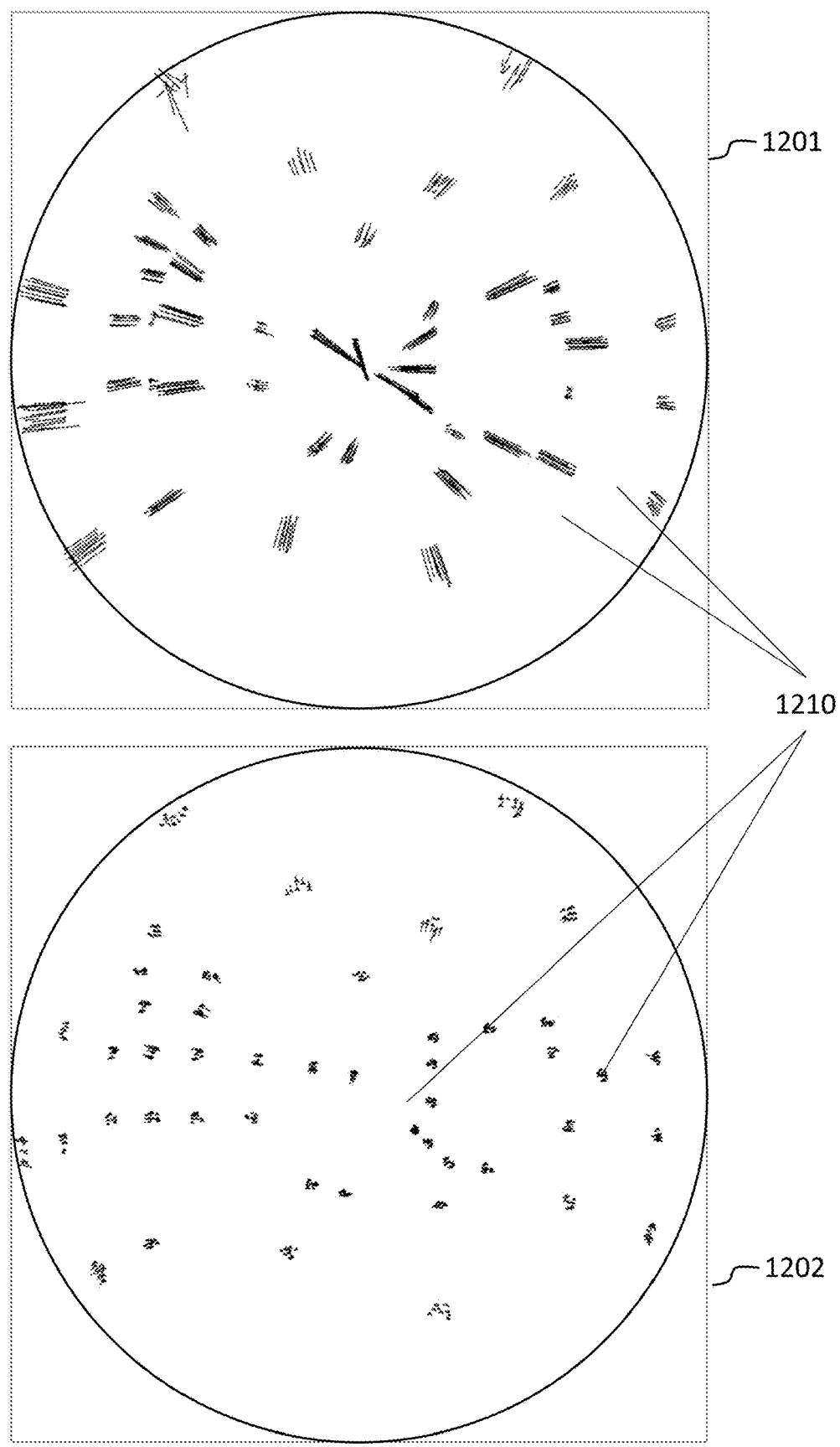
FIG. 11 shows the image point residuals reduction by using the method depicted at FIG. 10 compared to a method with no image partitioning.

FIG. 11 shows the image point residuals computed by using two correction models. It should be noted that the residuals are magnified by factor 50 for visualization purposes. View 1201 shows the result of modelling the systemic errors using the equations (2), as per existing solutions. Here the Root Mean Squares (RMS) of image point residuals is ~3.8 pixels with the largest residual of ~7 pixels. The residual errors 1210 are depicted using the arrows. View 1202 shows the result of modeling local systemic errors by using equations (3) and (4). Here the RMS of image point residuals is ~0.4 pixel (sub-pixel) with largest residual of ~2.5 pixels. In other words, the accuracy of the colorization provided by the ultrawide-angle 2D image is improved significantly by using the technical solutions described herein. The example results above, which are depicted in FIG. 11, indicate up to 10 times accuracy improvement by the correction model provided by the technical solutions described herein.

The corrected coordinates of the image are used during the colorization of the 3D point cloud in the method 200 (block 210). Accordingly, the 3D scan generated by the scanner system is colorized more accurately by embodiments described herein compared to existing solutions.

It should be appreciated that while embodiments herein describe the reduction of the image point residuals with reference to the use of the camera with the ultrawide-angle lens and a three-dimensional scanner, this is for example purposes and the claims should not be so limited. In other embodiments, the residual reduction could be used in other applications that use an omnidirectional camera, or a camera with a single ultrawide-angle lens to improve the accuracy of the image.

In some embodiment, when capturing a scan of an environment, a version of the simultaneous localization and mapping (SLAM) algorithm is used. For completing such scans a scanner, such as the FARO® SCANPLAN®, FARO® SWIFT®, FARO® FREESTYLE®, or any other scanning system incrementally builds the scan of the environment, while the scanner is moving through the environment, and simultaneously the scanner tries to localize itself on this scan that is being generated. An example of a handheld scanner is described in U.S. patent application Ser. No. 15/713,931, the contents of which is incorporated by reference herein in its entirety. This type of scanner may also be combined with a another scanner, such as a time of flight scanner as is described in commonly owned U.S. patent application Ser. No. 16/567,575, the contents of which are incorporated by reference herein in its entirety. It should be noted that the scanners listed above are just examples and that the type of scanner used in one or more embodiments does not limit the features of the technical solutions described herein.

Figure 12:
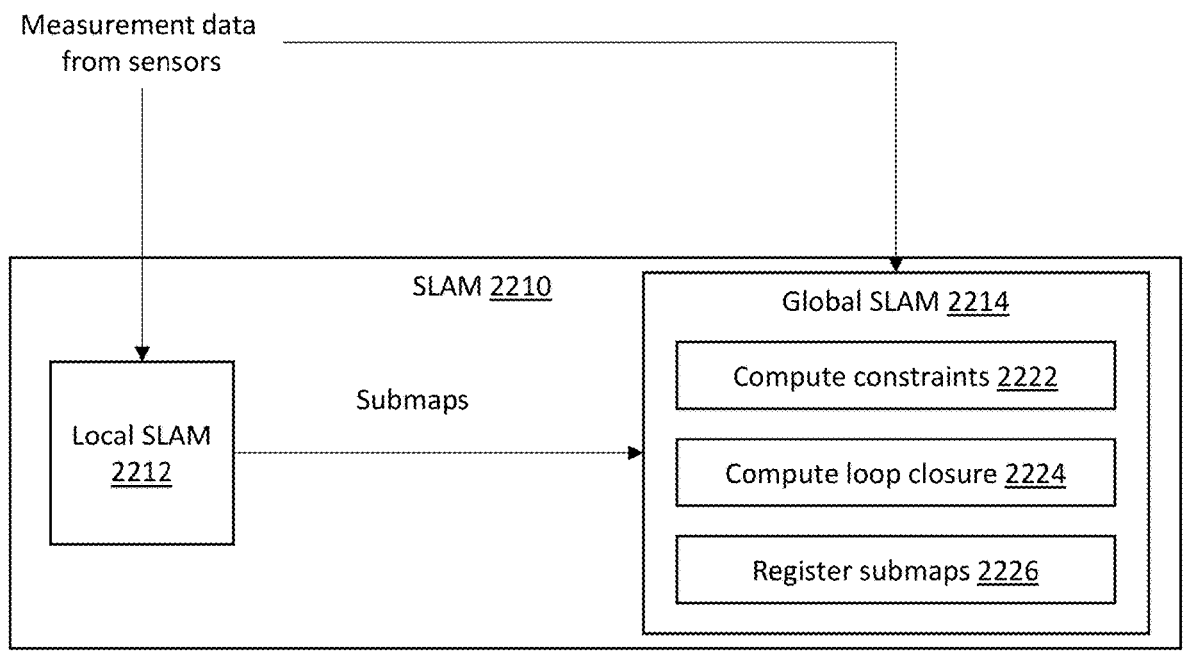
FIG. 12 depicts a high-level operational flow for implementing SLAM according to one or more embodiments of the present disclosure.

FIG. 12 depicts a high-level operational flow for implementing SLAM according to one or more embodiments of the present disclosure. Implementing SLAM 2210 includes generating one or more submaps corresponding to one or more portions of the environment. The submaps are generated using the one or more sets of measurements from the sensors of the scanner 20. Generating the submaps may be referred to as "local SLAM" (2212). The submaps are further combined by the SLAM algorithm to generate the map 130. Combining the submaps process may be referred to as "global SLAM" (2214). Together, generating the submaps and the final map 130 of the environment is referred to herein as implementing SLAM, unless specifically indicated otherwise.

It should be noted that the operations shown in FIG. 12 are at high level, and that typical implementations of SLAM 2210 can include operations such as filtering, sampling, and others, which are not depicted.

The local SLAM 2212 facilitates inserting a new set of measurement data captured by the scanner 20 into a submap construction. This operation is sometimes referred to as "scan matching." A set of measurements can include one or more point clouds, distance of each point in the point cloud(s) from the scanner 20, color information at each point, radiance information at each point, and other such sensor data captured by the set of sensors that is equipped on the scanner 20. For example, the sensors can include a LIDAR, a depth camera, a camera, etc. The scanner 20 can also include an inertial measurement unit (IMU) to keep track of a 3D orientation of the scanner 20.

The captured measurement data is inserted into the submap using an estimated pose of the scanner 20. The pose can be extrapolated by using the sensor data from sensors, the IMU, and/or from sensors besides the range finders to predict where the scanned measurement data is to be inserted into the submap. Various techniques are available for scan matching. For example, a point to insert the measured data can be determined by interpolating the submap and sub-pixel aligning the scan. Alternatively, the measured data is matched against the submap to determine the point of insertion. A submap is considered as complete when the local SLAM 2212 has received at least a predetermined amount of measurement data. Local SLAM 2212 drifts over time, and global SLAM 2214 is used to fix this drift.

It should be noted that a submap is a representation of a portion of the environment and that the map 130 of the environment includes several such submaps "stitched" together. Stitching the maps together includes determining one or more landmarks on each submap that is captured and aligning and registering the submaps with each other to generate the map 130. In turn, generating each submap includes combining or stitching one or more sets of measurements from the sensors of the scanner 20. Combining two sets of measurements requires matching, or registering one or more landmarks in the sets of measurements being combined.

Accordingly, generating each submap and further combining the submaps includes registering a set of measurements with another set of measurements during the local SLAM (2212), and further, generating the map 130 includes registering a submap with another submap during the global SLAM (2214). In both cases, the registration is done using one or more landmarks.

Here, a "landmark" is a feature that can be detected in the captured measurements, and which can be used to register a point from the first set of measurements with a point from the second set of measurements. For example, the landmark can facilitate registering a 3D point cloud with another 3D point cloud or to register an image with another image. Here, the registration can be done by detecting the same landmark in the two measurements (images, point clouds, etc.) that are to be registered with each other. A landmark can include, but is not limited to features such as a doorknob, a door, a lamp, a fire extinguisher, or any other such identification mark that is not moved during the scanning of the environment. The landmarks can also include stairs, windows, decorative items (e.g., plant, picture-frame, etc.), furniture, or any other such structural or stationary objects. In addition to such "naturally" occurring features, i.e., features that are already present in the environment being scanned, landmarks can also include "artificial" landmarks that are added by the operator of the scanner 20. Such artificial landmarks can include identification marks that can be reliably captured and used by the scanner 20. Examples of artificial landmarks can include predetermined markers, such as labels of known dimensions and patterns, e.g., a checkerboard pattern, a target sign, or other such preconfigured markers.

The global SLAM (2214) can be described as a pose graph optimization problem. As noted earlier, the SLAM algorithm is used to provide concurrent construction of a model of the environment (the scan), and an estimation of the state of the scanner 20 moving within the environment. In other words, SLAM gives you a way to track the location of a robot in the world in real-time and identify the locations of landmarks such as buildings, trees, rocks, walls, doors, windows, paintings, décor, furniture, and other world features. In addition to localization, SLAM also builds up a model of the environment to locate objects including the landmarks that surround the scanner 20 and so that the scan data can be used to ensure that the scanner 20 is on the right path as the scanner 20 moves through the world, i.e., environment. So, the technical challenge with the implementation of SLAM is that while building the scan, the scanner 20 itself might lose track of where it is by virtue of its motion uncertainty because there is no presence of an existing map of the environment (the map is being generated simultaneously).

The basis for SLAM is to gather information from the set of sensors 20 (including but not limited to the ultrawide angle camera 66) and motions over time and then use information about measurements and motion to reconstruct a map of the environment. The SLAM algorithm defines the probabilities of the scanner 20 being at a certain location in the environment, i.e., at certain coordinates, using a sequence of constraints. For example, consider that the scanner 20 moves in some environment, the SLAM algorithm is input the initial location of the scanner 20, say (0,0) initially, which is also called as Initial Constraints. The SLAM algorithm is then provided with several relative constraints that relate each pose of the scanner 20 to a previous pose of the scanner 20. Such constraints are also referred to as relative motion constraints.

The technical challenge of SLAM can also be described as follows. Consider that the scanner is moving in an unknown environment, along a trajectory described by the sequence of random variables $x_{1:T}=\{x_1, \ldots, x_T\}$. While moving, the scanner acquires a sequence of odometry measurements $u_{1:T}=\{u_1, \ldots, u_T\}$ and perceptions of the environment $z_{1:T}=\{z_1, \ldots, z_T\}$. The "perceptions" include the captured data and the mapped detected planes 410. Solving the full SLAM problem now includes estimating the posterior probability of the trajectory of the scanner 20 $x_{1:T}$ and the map M of the environment given all the measurements plus an initial position $x_0$: $P(x_{1:T}, M|z_{1:T}, u_{1:T}, x_0)$. The initial position $x_0$ defines the position in the map and can be chosen arbitrarily. There are several known approaches to implement SLAM, for example, graph SLAM, multi-level relaxation SLAM, sparse matrix-based SLAM, hierarchical SLAM, etc. The technical solutions described herein are applicable regardless of which technique is used to implement SLAM.

Figure 13:
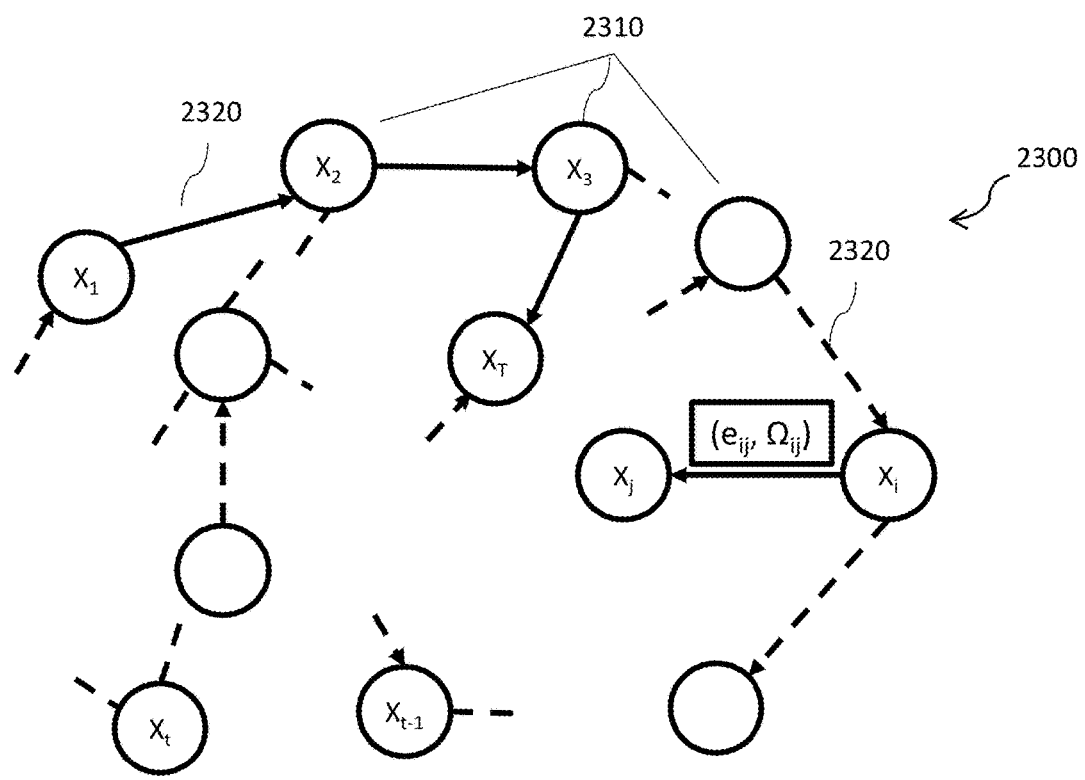
FIG. 13 depicts a graphical representation of an example SLAM implementation.

FIG. 13 depicts a graphical representation of an example SLAM implementation. In the depicted representation of the SLAM as a graph 2300, every node 2310 corresponds to a pose of the scanner 120. Nearby poses are connected by edges 2320 that model spatial constraints between poses of the scanner 120 arising from measurements. Edges $e_{t-1, t}$ between consecutive poses model odometry measurements, while the other edges represent spatial constraints arising from multiple observations of the same part of the environment.

A graph-based SLAM approach constructs a simplified estimation problem by abstracting the raw sensor measurements. These raw measurements are replaced by the edges 2320 in graph 2300, which can then be seen as "virtual measurements." An edge 2320 between two nodes 2310 are labeled with a probability distribution over the relative locations of the two poses, conditioned to their mutual measurements. In general, the observation model $P(z_t|x_t, M_t)$ is multi-modal, and therefore the Gaussian assumption does not hold. This means that a single observation $z_t$ might result in multiple potential edges connecting different poses in the graph, and the graph connectivity needs itself to be described as a probability distribution. Directly dealing with this multi-modality in the estimation process would lead to a combinatorial explosion of complexity. As a result of that, most practical approaches restrict the estimate to the most likely topology. Hence, a constraint resulting from observation has to be determined.

If the observations are affected by (locally) Gaussian noise and the data association is known, the goal of a graph-based mapping algorithm is to compute a Gaussian approximation of the posterior over the trajectory of the scanner 120. This involves computing the mean of this Gaussian as the configuration of the nodes 2310 that maximizes the likelihood of the observations. Once the mean is known, the information matrix of the Gaussian can be obtained in a straightforward fashion, as is known in the art. In the following, we will characterize the task of finding this maximum as a constraint optimization problem.

Let $x=(x_1, \ldots, x_T)^T$ be a vector of parameters, where $x_i$ describes the pose of node i. Let $z_{ij}$ and $\Omega_{ij}$ be respectively the mean and the information matrix of a virtual measurement between the node i and the node j. This virtual measurement is a transformation that makes the observations acquired from i maximally overlap with the observation acquired from j. Further, let $\hat{z}_{ij}(x_i, x_j)$ be the prediction of a virtual measurement given a configuration of the nodes $x_i$ and $x_j$. Usually, this prediction is the relative transformation between the two nodes. Let $e(x_i, x_j, z_{ij})$ be a function that computes a difference between the expected observation $\hat{z}_{ij}$ and the real observation $z_{ij}$ captured by the scanner 120. For simplicity of notation, the indices of the measurement are encoded in the indices of the error function: $e_{ij}(x_i, x_j)=z_{ij}-\hat{z}_{ij}(x_i, x_j)$.

If C is the set of pairs of indices for which a constraint (observation) z exists, the goal of a maximum likelihood approach is to find the configuration of the nodes x* that minimizes the negative log-likelihood F(x) of all the observations: $F(x)=\Sigma_{(i,j)\in C}F_{ij}$, where $F_{ij}=e_{ij}^T\Omega_{ij}e_{ij}$. Accordingly, implementing SLAM includes solving the following equation and computing a Gaussian approximation of the posterior over the trajectory of the scanner 120: $x^*=\mathrm{argmin}_x F(x)$.

Several techniques are known for solving the above equations, for example, using Gauss-Newton or the Levenberg-Marquardt algorithms. The technical solutions provided by one or more embodiments of the present disclosure can be used regardless of how the SLAM algorithm is implemented, i.e., regardless of how the above equations are solved. The technical solutions described herein provide the set of constraints C that is used for implementing the SLAM algorithm, using whichever technique is to be used.

Accordingly, implementing global SLAM 2214 includes determining constraints (2222) between nodes 2320, i.e., submaps, objects, landmarks, or any other elements that are matched. Non-global constraints (also known as inter submaps constraints) are built automatically between nodes 2310 that are closely following each other on a trajectory of the scanner 120 in the environment. Global constraints (also referred to as loop closure constraints or intra submaps constraints) are constraints between a new submap and previous nodes 2310 that are considered "close enough" in space and a strong fit, i.e., a good match when running scan matching. Here, "close enough" is based on predetermined thresholds, for example, distance between the same landmark from two submaps being within a predetermined threshold.

For example, existing implementations of SLAM use measurements, such as LIDAR data, from the set of sensors of the scanner 20, to aggregate the measurements to generate the submaps and eventually the map 130. A technical challenge with such implementations is that the matching of the sets of measurements is inaccurate due to ambiguities or missing data. This may lead to misaligned sets of measurements and/or submaps, which in turn, cause an erroneous submap and/or map 130. In some embodiments, "loop closure" 2224 is used to prevent such errors by compensating for accumulated errors. However, because of missing data or ambiguities in the data that is collected, the result of the SLAM implementation can be adversely affected by missing loop closure and/or by drift. A "missing loop closure" indicates that during execution of the global SLAM 2214, a loop closure 2224 is not deemed necessary based on the constraints and/or the measurement data that is received. Alternatively, the drift from the measurement data is larger than a predetermined threshold, and hence, is not compensated by the loop closure 2224. Accordingly, registering the submaps 2226 can result in misaligned submaps.

To address the technical challenges with the misaligned submaps, embodiments described herein use the ultrawide-angle images that are corrected using the sensor model as described herein for correcting position errors during runtime, when a drift of position or missing loop closure occurs and is detected. It should be appreciated that in some embodiments images acquired by an ultrawide-angle camera, such as the camera 66 that has been calibrated or compensated in the manner described herein, provides advantages in allowing additional features (constraints) to be identified and thus allow the registration of submaps with less overlap than in previous systems.

In one or more embodiments, the scanner 120 provides a graphical user-interface (GUI) for the operator to match a current position or any other portion from the present scan with a known point in the map 130. The known point can be a landmark, and in some embodiments, a user-identifiable landmark. For example, the known point can be a feature, such as, a corner with a 90-degree angle, walls with a particular length, pillars with a defined shape that can be defined using geometry primitives like a circle. Alternatively, the known point can be a "scan position," i.e., a position of the scanner 20 in the environment from which measurements are captured. Alternatively, the landmarks are automatically detected using image analysis on the ultra-wide-angle images that are captured.

Figure 14:
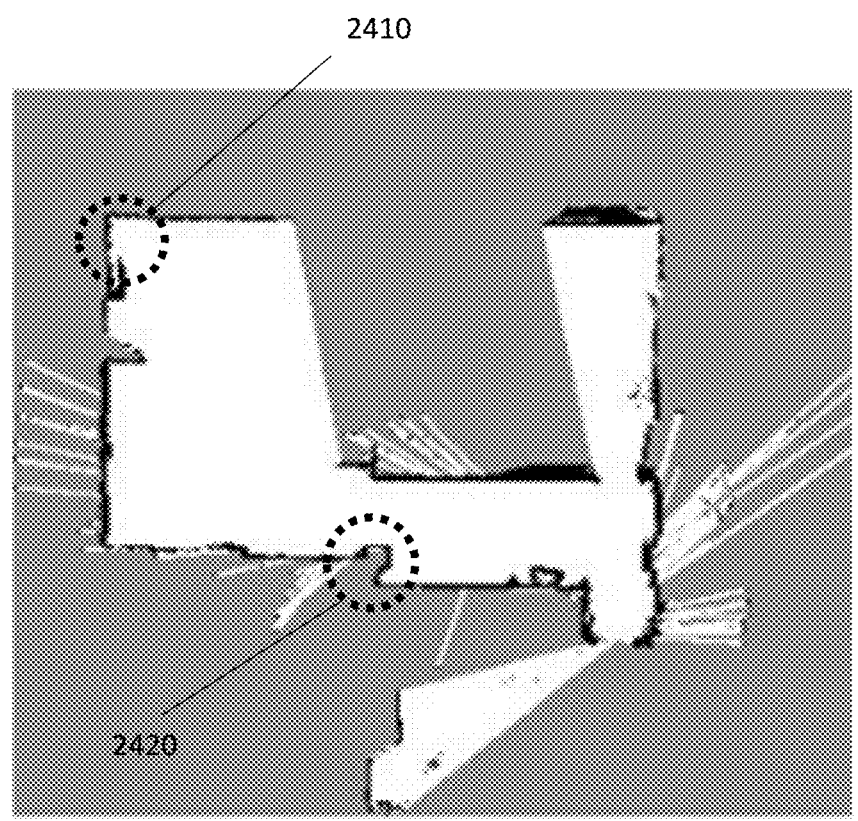
FIG. 14 depicts example features or portions of the environment that can be noted and used by the operator to facilitate aligning one or more submaps according to one or more embodiments of the present disclosure.

FIG. 14 depicts example features or portions of the environment that can be noted and used by the operator to facilitate aligning one or more submaps according to one or more embodiments of the present disclosure. The features can include a corner 2410, a door 2420, or any other such landmark that the operator can identify as being misplaced when looking at a scan that is captured by the scanner 20 in real time, and at runtime. Here, a "scan" can be a set of measurement data, where multiple such scans are combined to form a submap, and where several such submaps are combined to form a map of the surrounding environment. It should be noted that a top view of the captured data is shown in 2D to depict the examples of the features in FIG. 14, however, the data captured by the scanner 20 can include 3D point clouds of the surrounding environment.

If the same features are detected in multiple scans, the feature is used as a constraint for matching of the multiple scans during the local SLAM 2212. The features are also used for initialization to generate submaps that include multiple matched data. This matching maybe implemented as nonlinear optimization with a cost function. In one or more embodiments of the present disclosure, the cost function can include equations for the distance of the semantic features from the scanner 20 to improve the accuracy and robustness of the SLAM algorithm (2210). Further, in one or more embodiments of the present disclosure, the features can be used in some situations to improve the robustness and speed of optimization during initialization of the SLAM algorithm (2210).

Additionally, the features can be reused as indicator for loop closure in the case where the feature which can be identified globally e.g., line/wall segments through their length. If multiple such landmarks are identified between two submaps the loop closure can be evaluated using the timestamp and the features for the alignment and registration of the multiple submaps. The features can be used to create a constraint for such alignment.

The features can also be used in the global SLAM 2214 optimization as constraints for the connection between the submaps and the orientation of the scanner 20. Once the loop closure 2224 is completed, the global SLAM 2214 is completed by registering 2226 the submaps and stitching the submaps to generate the map of the environment. In one or more embodiments of the present disclosure, SLAM 2210 is performed iteratively as newer measurements are acquired by the scanner 20.

In one or more embodiments, the scanner 20 is coupled with a computing system (not shown) such as, a desktop computer, a laptop computer, a tablet computer, a phone, or any other type of computing device that can communicate with the scanner 20. One or more operations for implementing SLAM can be performed by the computing system. Alternatively, or in addition, one or more of the operations can be performed by a processor 122 that is equipped on the scanner 20. In one or more embodiments of the present disclosure, the processor 122 and the computing system can implement SLAM in a distributed manner. The processor 122 can include one or more processing units. The processor 122 controls the measurements performed using the set of sensors. In one or more examples, the measurements are performed based on one or more instructions received from the computing system.

In one or more embodiments of the present disclosure, the computing device and/or a display (not shown) of the scanner 20 provides a live view of the map of the environment being scanned by the scanner 20 using the set of sensors. The map can be a 2D or 3D representation of the environment seen through the different sensors. The map can be represented internally as a grid map. A grid map is a 2D or 3D arranged collection of cells, representing an area of the environment. In one or more embodiments of the present disclosure, the grid map stores for every cell, a probability indicating if the cell area is occupied or not. Other representations of the map can be used in one or more embodiments of the present disclosure.

As noted earlier, the scanner 20, along with capturing the map, is also locating itself within the environment. The scanner 20 uses odometry, which includes using data from motion or visual sensors to estimate the change in position of the scanner 20 over time. Odometry is used to estimate the position of the scanner 20 relative to a starting location. This method is sensitive to errors due to the integration of velocity measurements over time to give position estimates.

Figure 15:
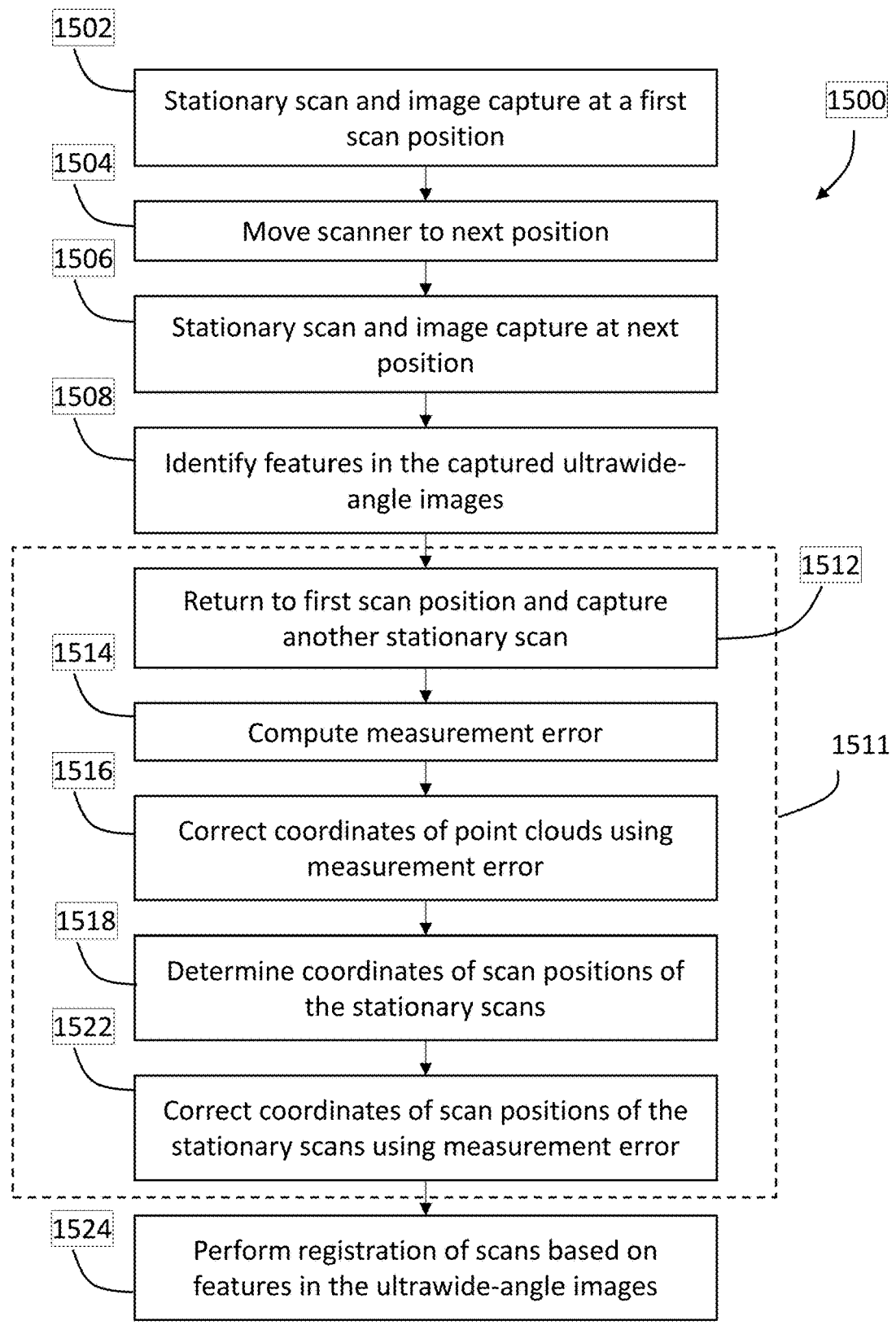
FIG. 15 depicts a flowchart of a method 1500 for aligning and registering scans according to one or more embodiments.
Figure 16:
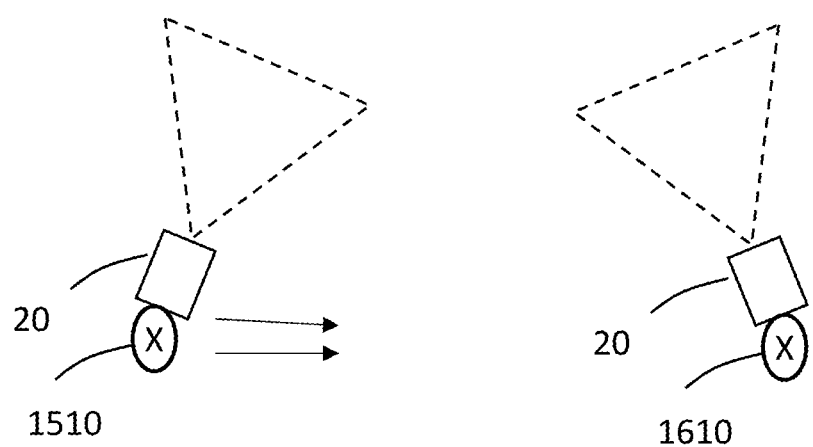
FIG. 16 depicts an example scenario where the scanner is moved from one position to another to capture a corresponding scan from each position.

FIG. 15 depicts a flowchart of a method 1500 for aligning and registering scans according to one or more embodiments. The method 1500 is described in conjunction with the example scenario depicted in FIG. 16. Referring to FIG. 15, at block 1502, the scanner 20 is used to perform a scan at a first position 1510 (FIG. 16). During the scan at the first position 1510, the scanner 20 acquires 3D coordinates for a first plurality of points on surfaces in the environment being scanned. In an embodiment, timestamp, and a pose of the scanner are also captured. In addition, an ultrawide-angle image (360 degrees) is captured from the first scan position 1510. A pose of the ultrawide-angle camera 66 is also captured in the case that the camera 66 is not integral with the scanner 20. In an embodiment, the pose of the ultrawide-angle camera 66 is in relation to the scanner 20. In an embodiment, the calibration/compensation methods described herein are performed prior to the performing of stationary scan 1502.

The method 1500 then proceeds to block 1504 where the scanner 20 is moved from the first position 1510 to a next position (e.g., location 1610 of FIG. 16). Another scan is captured at the next position 1610, including an ultrawide-angle image, at block 1506. The second scan acquires the 3D coordinates of a second plurality of points on surfaces in the environment being scanned. An estimated pose of the scanner 20 and the camera 66 is also captured in association with the scan. It should be appreciated that in some embodiments, the method 1500 may then loop back to block 1504 and additional scanning is performed at additional locations.

The ultrawide-angle images that are captured at each scan position are analyzed to identify one or more features in the images, at block 1508. The features can be detected manually, by an operator, via a user-interface. Alternatively, or in addition, the features are automatically detected in the ultrawide-angle images. The feature detection is performed after the ultrawide-angle images are corrected as described herein to map the images with the corresponding 3D point clouds.

Figure 17:
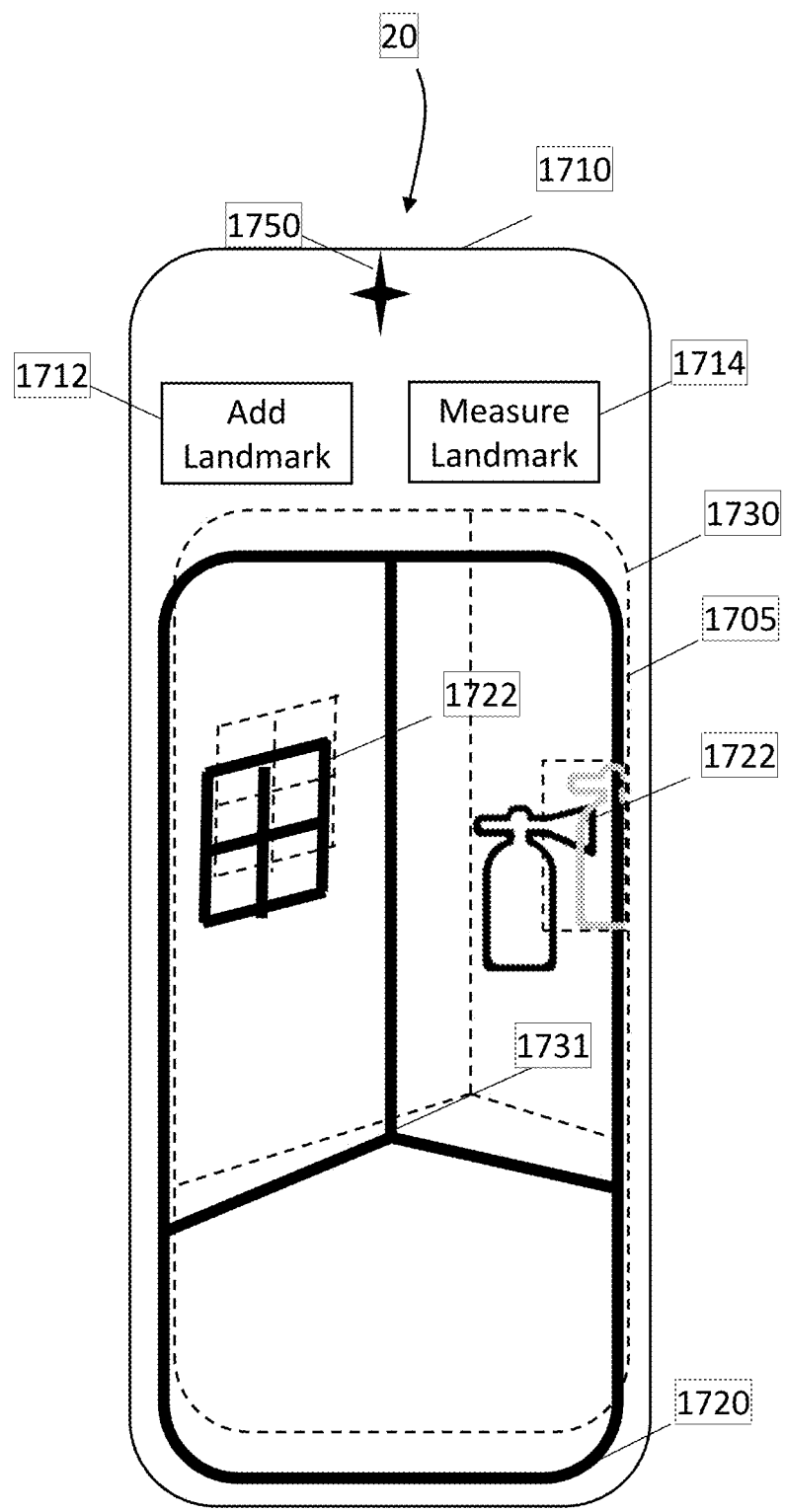
FIG. 17 depicts a user interface for assigning features and for aligning scans based on the features.

One or more features are recorded as landmarks when the scanner 20 is at a first scan position 1510. The features are detected, automatically, semi-automatically, or manually. For example, the operator can select "add landmark" 1712 (FIG. 17) via a user-interface 1710 of the scanner 20. The operator captures the scan 1705 from the present scan position 1510. Alternatively, or in addition, the scan 1705 is automatically captured by the scanner 20 in response to an instruction executed by the controller. The scan 1705 is saved as complementary data with the scan position 1510 and the scan position 1510 is marked to indicate that it is a landmark. In one or more examples, the landmark is represented as a flag (or any other marker) in the map. The present scan position 1510 of the scanner 20 is recorded as part of the landmark.

In one or more examples, the scan 1705 is captured to include specific features in the environment. In addition, the scan 1705 is captured to include specific objects 1722 in the environment that are relatively immovable, and that can be used as reference objects at a future time when the scanner 20 is optionally returned to the scan position 1510. For example, the scan 1705 includes objects 1722 that are identifiable (e.g. landmarks or artificial targets) and that facilitate the operator to recognize that the scanner 20 is at substantially the same position (1510) when the scanner 20 returns after mapping. For example, the identifiable objects 1722 can include construction items such as windows, doors, corners, pillars, beams, and the like. Alternatively, or in addition, the identifiable objects 1722 can include items that have a relatively immovable position, such as a fire extinguisher (which may be required at particular position because of regulations/code), a defibrillator, a statue, a water fountain, a plant, and the like. The identifiable objects 1722 may also be artificial targets placed in the environment by the operator, such as spherical or checkerboard targets.

In one or more examples, the scanner 20 detects the identifiable objects 1722 and features in the environment as the mapping is being performed. For example, the scanner 20 is preconfigured with a list of identifiable objects 1722 and features that can be present in the environment. The scanner 20 performs an object and feature recognition in the field of view as the platform is being moved. If any one or more of the objects and features from the list is detected in the field of view, the scanner 20 notifies the operator that a landmark can be recorded at the present scan position. For example, a visual notification 1750 is shown on the user-interface 1710. The visual notification can be a popup, a dropdown, a flashing light, or any other type of visual notification. Alternatively, or in addition, the notification can include an audio notification, a haptic notification, or any other type of notification to suggest the operator that the present position 1510 can be used as a virtual landmark.

In an embodiment, an optional set of steps 1511 may be performed. In this embodiment, the scanner 20 continues to capture scans 1705 at multiple other scan positions 1610 and returns to the first scan position, at block 1512. Capturing the present position procedure is repeated for every scan 1705 captured by the scanner 20. For example, if the scanner 20 captures n scans a data structure holds n positions with n links to the corresponding measurement data of the portion scanned. In one or more examples, the scanner 20 saves the present position in a data structure such as a list of positions. Every position in the data structure is directly linked to the data structure that is used to store the measurements of the corresponding portion of the environment.

At the position 1510 where landmark that was added before, the scanner 20 computes the measurement error 1530 that is input into the SLAM algorithms to correct the error/drift accumulated from walking around the scanned portion of the environment, at block 1514. In one or more embodiments of the present disclosure, computing the measurement error 1530 (FIG. 18) includes moving the scanner 20 to an estimated position 1520. The estimated position is an estimate of the first scan position 1510 where the landmark was recorded. In one or more embodiments of the present disclosure, the operator selects a "measure landmark" instruction 1714 at the estimated position 1520. In one or more examples, (see FIG. 17) the user-interface 1710 depicts to the operator the original view (e.g., ultrawide-angle image) 1720 that was captured by the scanner 20 when the virtual landmark was recorded. A present view 1730 from the camera 66 is overlaid on the original image 1720 in a transparent manner. The operator can move the scanner 20 until the present view 1730 substantially matches the original image 1720 in the overlay. The ultrawide-angle images are corrected using the correction parameters as described herein. Once the operator indicates that the overlays match, the system records a relative observation of the present scan position 1520 of the scanner 20. The difference 1530 between the recorded position 1510 of the virtual landmark and the present position 1520 is used as the error correction to update and correct the mapping positions.

In one or more examples, the difference is computed as a difference in the original ultrawide-angle image 1720 and the present view 1730 (second ultrawide-angle image) when the scanner 20 is at the virtual landmark. For example, the difference between the ultrawide-angle images is computed based on the landmarks in the first ultrawide-angle image 1720 and the present view 1730 (second ultrawide-angle image).

The method 1500 further includes using the measurement error 1530 to correct the coordinates captured by the scanner 20, at block 1516. The portion of the map 130 that is scanned and stored since capturing the virtual landmark is updated using the measurement error 1530, in one or more examples. In one or more examples, a loop closure operation is executed on the map, and parts of the map are corrected in order to match the real pose, which is the starting position 1510, with the estimated pose, which is the different position 1520. The loop closure algorithm calculates a displacement for each part of the map that is shifted by the algorithm.

In one or more examples, the scanner 20 determines the scan positions 1610 (FIG. 18) linked to each portion of the map, at block 1518. In one or more examples, a lookup is performed over the data structure that saves the list of positions. The lookup costs a single processor operation, such as an array lookup. The scanner 20 applies the displacement vector for a portion of the map to the corresponding scan positions saved in the data structure and saves the resulting displaced (or revised) scan positions back into the data structure, at block 1522. The scanner 20 computes displaced scan positions for each of the saved scan positions 1610 in the data structure. The procedure can be repeated every time the loop closure algorithm is applied.

Figure 18:
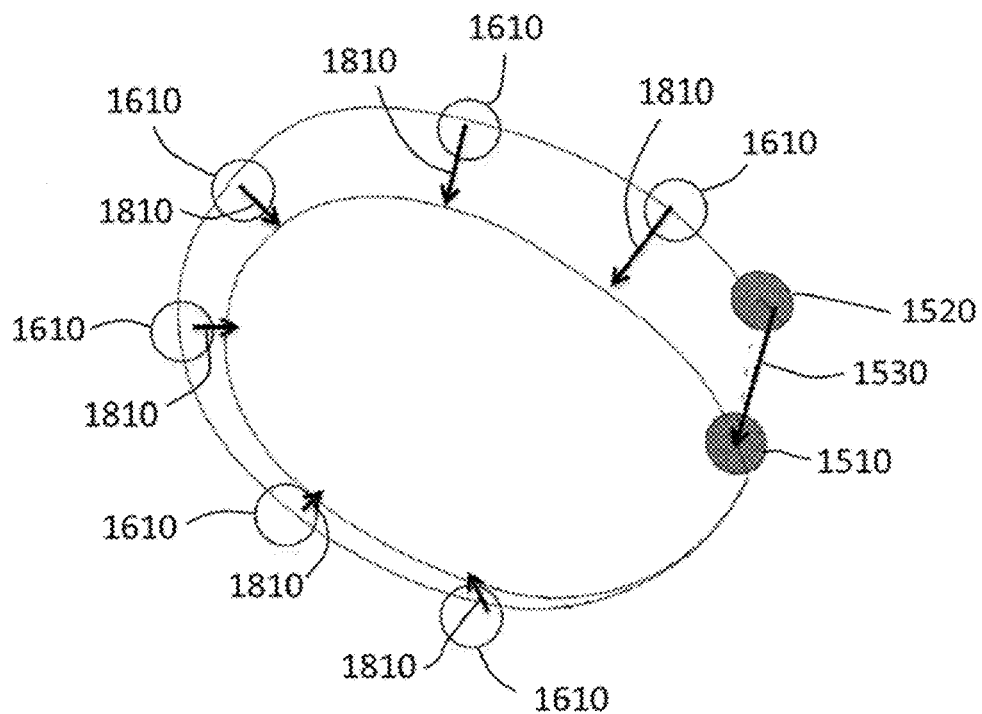
FIG. 18 depicts a visual depiction of error accumulation during movement of the scanner according to one or more embodiments.

The displaced scan positions represent corrected scan positions of the scans 1705 that can be used directly without applying further computational expensive point cloud registration algorithms. The accuracy of the scan positions 1610 depends on the sensor accuracy of the scanner 20. As shown in FIG. 18, the displacement vectors 1810 for the portions of the map are determined based on the loop closure operation. The scanner 20 applies the displacement vectors 1810 to the scan positions 1610 linked to the portions of the map by the data structure as described herein. The resulting displaced scan positions 1910 are accordingly calculated by applying the displacement vectors 1810 to the scan positions 1610. The displaced scan positions 1910 are now correctly located.

Referring back to FIG. 15, in an embodiment the method 1500 further includes registering the scans using the features that are detected using images from the ultrawide-angle camera 66 at each stationary scan position, at block 1524. The registration can further be used as constraints for the SLAM implementation. The registration can be performed at runtime in one or more embodiments. Determining the constraint, i.e., registration, includes generating a relationship by matching the features 830 that are detected from a first scan position 1610 with corresponding (same) features that are detected in an earlier frame from a different scan position.

Figure 19:
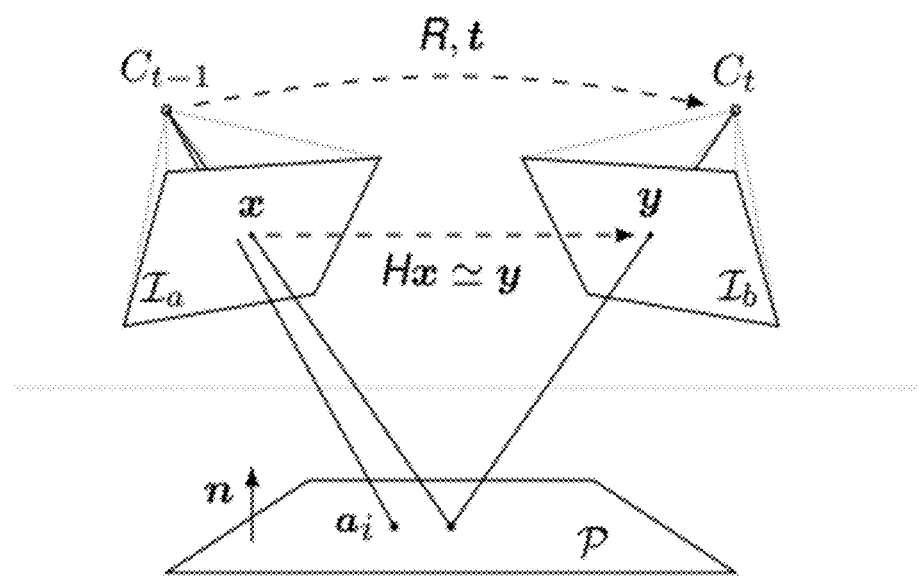
FIG. 19 depicts a block diagram of matching landmarks from one frame with another according to one or more embodiments of the present disclosure.

Here, each frame is captured at a particular pose of the scanner 20. The pose can include a position (i.e., coordinates in the environment), and orientation of the scanner 20. FIG. 19 depicts a block diagram of matching landmarks from one frame with another according to one or more embodiments of the present disclosure. $C_{t-1}$ depicts a first position of the scanner 20 at time t−1, and $C_t$ depicts a second position of the scanner 20 as it is moved from one scan position to another to scan the environment. From each of these positions, the scanner 20 and the ultrawide-angle camera 66 can observe and capture measurements of a plane P. Consider that a scan Ia is captured at the first position 1610 and a scan Ib is captured at the second position 1620. Each of these scans includes the plane P, which has a normal depicted by n.

Further, consider that the plane P has a landmark $a_i$ that is captured at a position x in the scan Ia from the first position; and further, that the landmark $a_i$ is at a position y in the second scan Ib that is captured from the second position. Matching the features detected from the first position 1610 and those detected from the second position 1620 includes determining the common features from the two positions. In this example scenario of FIG. 19, the landmark a, includes at least one of such common features.

Feature extraction to identify the landmark can be performed using one or more known algorithms such as, Harris corner detector, Harris-Laplace-scale-invariant version of Harris detector, multi-scale oriented patches (MOPs), scale invariant feature transform (SIFT), speeded up robust features (SURF), Features from accelerated segment test (FAST), binary robust invariant scalable key-points (BRISK) algorithm, oriented FAST and rotated BRIEF (ORB) algorithm, KAZE with M-SURF descriptor, and any other feature extraction technique. Some of the feature extraction techniques such as, SIFT, SURF, BRISK and ORB also provide descriptors for the extracted features. Alternatively, or in addition, any feature descriptor definition can be associated to the extracted features. For example, the following descriptor definitions can be used: normalized gradient, principal component analysis (PCA) transformed image patch, histogram of oriented gradients, gradient location and orientation histogram (GLOH), local energy-based shape histogram (LESH), BRISK, ORB, fast retina key-point (FREAK), and local discriminant bases (LDB).

In an embodiment, the feature extraction is based on a modified AKAZE algorithm which is executed on a graphics processing unit (GPU) to increase runtime efficiency. The descriptors assigned to the extracted features are the modified version of the M-SURF descriptors. The feature extraction results include a collection of points from each ultrawide-angle image, each point in the collection being an extracted "feature." The criteria for extracting such features can include detecting semantic features from the images such as, corners, edges, doors, windows, etc. Alternatively, or in addition, the feature extraction can include detecting points that provide combinations of parameters that facilitate reducing the number of features required to processed for effective feature matching. For example, such feature dimensionality reduction can include techniques such as principal component analysis (PCA), autoencoder, subspace learning, semidefinite embedding, isomap, partial least squares, etc.

Once $a_i$ is determined, the features across two or more scans, i.e., portions of the surrounding, are matched to perform registration. Registering includes determining a relationship between the positions of the same feature from the separate scan positions. The relationship can be a mapping between the point x that represents the feature from the first position, and the point y that represents the same feature from the second position. For example, the computing system 110 determines a mapping such as $Hx \approx y$. Here, H can be a matrix that translates and rotates x, where x and y can be 2D or 3D coordinates. In one or more embodiments of the present disclosure, x and y can be matrices that represent more than one point. H is a relative measurement constraint that can be used by the scanner 20 when implementing the SLAM algorithm. The transformation H is applied to both (or more) scans to align the scans according to the matching features.

A K-nearest neighbor (KNN) similarity search algorithm can be used here for feature matching. KNN similarity search algorithm is a non-parametric method used for classification and regression. The process of feature matching is time consuming. Hence, to speed-up the computation approximated nearest neighbor search like the FLANN algorithm can be performed in one or more embodiments. FLANN is a library for performing fast approximate nearest neighbor searches in high dimensional spaces. It should be noted that the feature matching is not limited to a specific algorithm, and that in other embodiments, the feature matching can be performed by executing algorithms that can be run on GPU like those in the libraries like FAISS, HNSW, etc.

As an example, consider the use of a feature that can be seen by the scanner 20 from various locations, which would be relative measurement constraints every time the scanner 20 sees a feature. So, SLAM can use those constraints in order to find the most likely configuration of the scanner path along with the location of features.

In some embodiment, the method 1500 proceeds from block 1508 directly to performing the registration 1524 based on the images acquired using the ultrawide-camera 66. This registration 1524 may be performed by matching landmarks, features, or targets in the images as described above. The matching of the of the landmarks, features, or targets, when combined with the pose information of the camera 66 relative to local coordinate frame of reference of the scanner 20 allows the combining of the 3D coordinate point data from each scan position to be converted into a global coordinate frame of references. It should be appreciated that in some embodiments the use of the ultrawide images for registration may allow for less overlap between adjacent scans to provide the technical effect of reducing the number of scan positions used in the acquisition of the 3D coordinate point data.

Embodiments of the present disclosure facilitate improvements to results of SLAM as well as loop closure, and consequently an improved scanning system for generating maps of an environment.

Terms such as processor, controller, computer, DSP, FPGA are understood in this document to mean a computing device that may be located within an instrument, distributed in multiple elements throughout an instrument, or placed external to an instrument.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description but is only limited by the scope of the appended claims.

What is claimed is:

1. A system comprising:
   a three-dimensional (3D) scanner that captures a 3D point cloud that comprises a plurality of 3D coordinates corresponding to one or more objects scanned in a surrounding environment;
   a camera that captures an image of the surrounding environment, wherein the image captures color information of the surrounding environment including the one or more objects, the image being an ultrawide-angle image with an angular field of view of at least 180°; and
   one or more processors operably coupled to the 3D scanner and the camera that register a first scan that is captured from a first position with a second scan that is captured from a second position, wherein the first scan comprises a first 3D point cloud captured via the 3D scanner and a first ultrawide-angle image captured via the camera, and the second scan comprises a second 3D point cloud captured via the 3D scanner and a second ultrawide-angle image captured via the camera, wherein the first scan and the second scan capture at least one overlapping portion, and wherein registering the first scan and the second scan comprises:
   partitioning each of the ultrawide-angle images into a plurality of regions comprising a first region and a second region, the plurality of regions being concentric rings around a center of the ultrawide-angle image;
   for a set of 3D coordinates (X, Y, Z) from each 3D point cloud from the first 3D point cloud and the second 3D point cloud, computing a corresponding set of 2D coordinates (x, y) from the corresponding ultrawide-angle image;
   in response to the 2D coordinates (x, y) being in the first region of the ultrawide-angle image, computing a first set of correction factors ($\Delta x1$, $\Delta y1$) associated with the first region, and are based on an estimated lens distortion of the camera in the first region, and adjusting the 2D coordinates using the first set of correction factors;
   in response to the 2D coordinates being in the second region of the ultrawide-angle image, computing a second set of correction factors ($\Delta x2$, $\Delta y2$) associated with the second region, and are based on an estimated lens distortion of the camera in the second region, and adjusting the 2D coordinates using the second set of correction factors;
   comparing the first ultrawide-angle image and the second ultrawide-angle image using the adjusted 2D coordinates to determine matching features in the first ultrawide-angle image and the second ultrawide-angle image;
   registering the first ultrawide-angle image and the second ultrawide-angle image based on the matching features; and
   aligning the first 3D point cloud and the second 3D point cloud based on the matching features.

2. The system of claim 1, wherein a zenith angle ($\theta$) is computed using the 3D coordinates in a manner that eliminates disambiguation of a resulting sign and value of a coefficient m, which is used to compute the 2D coordinates corresponding to the 3D coordinates.

3. The system of claim 1, wherein the first set of correction factors is computed using a first set of equations, which is different from a second set of equations used to compute the second set of correction factors.

4. The system of claim 1, wherein the one or more processors are part of the 3D scanner.

5. The system of claim 1, wherein the camera is mounted on the 3D scanner at a predetermined position.

6. A method comprising:
   capturing a first three-dimensional (3D) point cloud and a second 3D point cloud, each of the 3D point clouds comprises a plurality of 3D coordinates corresponding to one or more objects scanned in a surrounding environment, the first 3D point cloud and the second 3D point cloud capturing at least one overlapping portion;
   capturing a first ultrawide-angle image and a second ultrawide-angle image of the surrounding environment, the first ultrawide-angle image captures color information of the first 3D point cloud, and the second ultrawide-angle image captures color information of the second 3D point cloud, with an angular field of view of at least 180°;
   registering the first 3D point cloud and the second 3D point cloud by mapping one or more features from the first ultrawide-angle image and the second ultrawide-angle image, wherein the registering comprises:
   partitioning each of the ultrawide-angle images into a plurality of regions comprising a first region and a second region, the plurality of regions being concentric rings around a center of the ultrawide-angle image;
   for a set of 3D coordinates (X, Y, Z) from each 3D point cloud from the first 3D point cloud and the second 3D point cloud, computing a corresponding set of 2D coordinates (x, y) from the corresponding ultrawide-angle image;
   in response to the 2D coordinates (x, y) being in the first region of corresponding the ultrawide-angle image, computing a first set of correction factors ($\Delta x1$, $\Delta y1$) associated with the first region, and are based on an estimated lens distortion of the camera in the first region, and adjusting the 2D coordinates using the first set of correction factors;
   in response to the 2D coordinates being in the second region of the corresponding ultrawide-angle image, computing a second set of correction factors ($\Delta x2$, $\Delta y2$) associated with the second region, and are based on an estimated lens distortion of the camera in the second region, and adjusting the 2D coordinates using the second set of correction factors; and
   comparing the first ultrawide-angle image and the second ultrawide-angle image using the adjusted 2D coordinates to determine matching features in the first ultrawide-angle image and the second ultrawide-angle image;

registering the first ultrawide-angle image and the second ultrawide-angle image based on the matching features; and aligning the first 3D point cloud and the second 3D point cloud based on the matching features.

7. The method of claim 6, wherein a zenith angle (θ) is computed using the 3D coordinates in a manner that eliminates disambiguation of a resulting sign and value of a coefficient m, which is used to compute the 2D coordinates corresponding to the 3D coordinates.

8. The method of claim 6, wherein the first set of correction factors is computed using a first set of equations, which is different from a second set of equations used to compute the second set of correction factors.

9. A memory device with computer executable instructions stored thereon, the computer executable instructions when executed by one or more processors cause the one or more processors to perform a method comprising:

capturing a first three-dimensional (3D) point cloud and a second 3D point cloud, each of the 3D point clouds comprises a plurality of 3D coordinates corresponding to one or more objects scanned in a surrounding environment, the first 3D point cloud and the second 3D point cloud capturing at least one overlapping portion;

capturing a first ultrawide-angle image and a second ultrawide-angle image of the surrounding environment, the first ultrawide-angle image captures color information of the first 3D point cloud, and the second ultrawide-angle image captures color information of the second 3D point cloud, with an angular field of view of at least 180°;

registering the first 3D point cloud and the second 3D point cloud by mapping one or more features from the first ultrawide-angle image and the second ultrawide-angle image, wherein the registering comprises:

partitioning each of the ultrawide-angle images into a plurality of regions comprising a first region and a second region, the plurality of regions being concentric rings around a center of the ultrawide-angle image for a set of 3D coordinates (X, Y, Z) from each 3D point cloud from the first 3D point cloud and the second 3D point cloud, computing a corresponding set of 2D coordinates (x, y) from the corresponding ultrawide-angle image;

in response to the 2D coordinates (x, y) being in the first region of the corresponding ultrawide-angle image, computing a first set of correction factors ($\Delta x1$, $\Delta y1$) associated with the first region, and are based on an estimated lens distortion of the camera in the first region, and adjusting the 2D coordinates using the first set of correction factors;

in response to the 2D coordinates being in the second region of the corresponding ultrawide-angle image, computing a second set of correction factors ($\Delta x2$, $\Delta y2$) associated with the second region, and are based on an estimated lens distortion of the camera in the second region, and adjusting the 2D coordinates using the second set of correction factors; and comparing the first ultrawide-angle image and the second ultrawide-angle image using the adjusted 2D coordinates to determine matching features in the first ultrawide-angle image and the second ultrawide-angle image;

registering the first ultrawide-angle image and the second ultrawide-angle image based on the matching features; and aligning the first 3D point cloud and the second 3D point cloud based on the matching features.

10. The memory device of claim 9, wherein a zenith angle (θ) is computed using the 3D coordinates in a manner that eliminates disambiguation of a resulting sign and value of a coefficient m, which is used to compute the 2D coordinates corresponding to the 3D coordinates.

11. The memory device of claim 9, wherein the first set of correction factors is computed using a first set of equations, which is different from a second set of equations used to compute the second set of correction factors.

\* \* \* \* \*